US011561439B2

(12) United States Patent
Kawahira et al.

(10) Patent No.: US 11,561,439 B2
(45) Date of Patent: Jan. 24, 2023

(54) LIQUID CRYSTAL DISPLAY DEVICE

(71) Applicant: SHARP KABUSHIKI KAISHA, Sakai (JP)

(72) Inventors: Yuichi Kawahira, Sakai (JP); Akira Hirai, Sakai (JP); Akira Sakai, Sakai (JP); Kazutoshi Kida, Sakai (JP); Yasuhiro Sugita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/555,177

(22) Filed: Dec. 17, 2021

(65) Prior Publication Data

US 2022/0197091 A1    Jun. 23, 2022

(30) Foreign Application Priority Data

Dec. 22, 2020  (JP) .............................. JP2020-212613

(51) Int. Cl.
| | | |
|---|---|---|
| *G02F 1/1337* | (2006.01) | |
| *G02F 1/1368* | (2006.01) | |
| *G02F 1/1362* | (2006.01) | |
| *G02F 1/1335* | (2006.01) | |
| *G02F 1/1333* | (2006.01) | |

(Continued)

(52) U.S. Cl.
CPC ...... *G02F 1/133738* (2021.01); *G02F 1/1368* (2013.01); *G02F 1/13338* (2013.01); *G02F 1/13439* (2013.01); *G02F 1/133553* (2013.01); *G02F 1/136209* (2013.01); *G02F 1/136222* (2021.01); *G02F 1/136295* (2021.01);
(Continued)

(58) Field of Classification Search
CPC .......... G02F 1/133738; G02F 1/13338; G02F 1/133553; G02F 1/13439; G02F 1/136209; G02F 1/136222; G02F 1/136295; G02F 1/1368; G06F 3/0412; G06F 3/04164
USPC .......................................... 349/12
See application file for complete search history.

(56) References Cited

U.S. PATENT DOCUMENTS 5,751,381 A * 5/1998 Ono ................... G02F 1/136286
                                                   257/E29.147
2005/0270446 A1* 12/2005 Kim ................... G02F 1/136209
                                                   349/110

(Continued)

FOREIGN PATENT DOCUMENTS

| JP | 2005-195824 A | 7/2005 |
|---|---|---|
| JP | 2006-201782 A | 8/2006 |
| JP | 2017-116821 A | 6/2017 |

*Primary Examiner* — Charles S Chang
(74) *Attorney, Agent, or Firm* — ScienBiziP, P.C.

(57) ABSTRACT

A liquid crystal display device includes, in order from an observation surface side to a back surface side, a thin film transistor substrate including a color filter layer, a pair of electrodes, and a metal wiring line, a liquid crystal layer containing liquid crystal molecules that are horizontally aligned to the thin film transistor substrate and in which alignment of the liquid crystal molecules is changed due to an electric field generated by applying a voltage to the pair of electrodes, a counter substrate, and a backlight, in which the counter substrate includes a reflective layer disposed outside the pixel area and reflecting incident light from the backlight to the back surface side, the pair of electrodes are a first electrode having a planar shape and a second electrode provided with a and the color filter layer is disposed on the observation surface side of the second electrode.

6 Claims, 24 Drawing Sheets

(51) Int. Cl.
*G02F 1/1343* (2006.01)
*G06F 3/041* (2006.01)
*G06F 3/044* (2006.01)

(52) U.S. Cl.
CPC ............ *G06F 3/044* (2013.01); *G06F 3/0412* (2013.01); *G06F 3/04164* (2019.05)

(56) References Cited

U.S. PATENT DOCUMENTS

| | | |
|---|---|---|
| 2006/0159958 A1 | 7/2006 | Lee |
| 2010/0238386 A1* | 9/2010 | Yin .......................... H01J 9/50 445/2 |
| 2020/0064683 A1* | 2/2020 | Hirai ..................... G02F 1/1362 |
| 2020/0159066 A1* | 5/2020 | Kawahira ......... G02F 1/133528 |

* cited by examiner

LIQUID CRYSTAL DISPLAY DEVICE

CROSS-REFERENCE TO RELATED APPLICATIONS

This application claims the benefit of priority to Japanese Patent Application Number 2020-212613 filed on Dec. 22, 2020. The entire contents of the above-identified application are hereby incorporated by reference.

BACKGROUND

Technical Field

The disclosure relates to a liquid crystal display device. More specifically, the disclosure relates to a horizontal alignment mode liquid crystal display device.

The liquid crystal display device is a display device that utilizes liquid crystal compositions for display, and in a typical display method thereof, the amount of light transmitted is controlled by applying a voltage to the liquid crystal compositions encapsulated between a thin film transistor substrate and a counter substrate, and changing an alignment state of liquid crystal molecules in the liquid crystal compositions in accordance with the applied voltage. Such a liquid crystal display device has features such as a thin profile, light weight, and low power consumption, and is therefore used in various fields.

The liquid crystal display device is provided with a color filter (CF) for performing color display. Although the CF is commonly provided in the counter substrate, a CF on array (COA) technology for providing the CF on the TFT substrate side has also been investigated. For example, JP 2017-116821 A discloses a liquid crystal display device including a first substrate, a second substrate, and a liquid crystal layer, in which the first substrate includes a scanning line and a signal line, a switching element electrically coupled to the scanning line and the signal line, a first electrode, a color filter common wiring line being in contact with the first electrode along the signal line, a reflection suppression layer located on the common wiring line, an insulating layer covering the reflection suppression layer and the first electrode, a second electrode electrically coupled to the switching element through a contact hole formed by openings formed at least in the insulating layer and the color filter layer, an inflow prevention layer forming a protruding portion that surrounds the contact hole, and an alignment film covering the insulating layer, the second electrode, and the inflow prevention layer.

SUMMARY

The liquid crystal display device according to the first embodiment of JP 2017-116821 A includes a backlight, the first substrate provided with the switching element, the liquid crystal layer, and the second substrate in order from a back surface side to an observation surface side, and the first substrate includes the color filter layer and the second electrode provided with a slit in order from the back surface side to the observation surface side. The liquid crystal display device according to the first embodiment of JP 2017-116821 A is a COA liquid crystal display device in which the color filter layer and the switching element are provided on the same substrate. By providing the color filter layer and various wiring lines on one substrate (first substrate) and omitting a light blocking layer from another substrate (second substrate), the brightness of the liquid crystal display device can be enhanced. However, when external light is incident on the liquid crystal display device according to the first embodiment of JP 2017-116821 A, diffraction of the external light is caused by the second electrode provided with the slit, and iridescent reflection is visible on the observation surface side.

When the color filter layer of the liquid crystal display device according to the first embodiment of JP 2017-116821 A is provided on the second substrate disposed on the observation surface side, the diffraction of the external light caused by the second electrode can be absorbed by the color filter layer provided on the second substrate. Therefore, the iridescent reflection can be suppressed. However, in the liquid crystal display device in which the color filter layer is provided on the second substrate, the brightness enhancement effect obtained in the COA liquid crystal display device cannot be obtained.

The disclosure has been made in view of the above situation and an object of the disclosure is to provide a horizontal alignment mode liquid crystal display device capable of enhancing brightness and suppressing iridescent reflection.

[Item 1] A liquid crystal display device according to one embodiment of the disclosure includes, in order from an observation surface side to a back surface side, a thin film transistor substrate including a color filter layer, a pair of electrodes disposed in a pixel area, and a metal wiring line disposed outside the pixel area, a liquid crystal layer containing liquid crystal molecules that are horizontally aligned to the thin film transistor substrate, and in which alignment of the liquid crystal molecules is changed due to an electric field generated by applying a voltage to the pair of electrodes, a counter substrate, and a backlight, in which the counter substrate includes a reflective layer disposed outside the pixel area and reflecting incident light from the backlight to the back surface side, the pair of electrodes include a first electrode having a planar shape and a second electrode provided with a slit, and the color filter layer is disposed on the observation surface side of the second electrode.

[Item 2] In the liquid crystal display device according to another embodiment of the disclosure, in addition to the configuration of Item 1, the thin film transistor substrate further includes a black film disposed on the observation surface side of the metal wiring line.

[Item 3] In the liquid crystal display device according to still another embodiment of the disclosure, in addition to the configuration of Item 1 or 2, the color filter layer is disposed on the observation surface side of the metal wiring line.

[Item 4] In the liquid crystal display device according to yet another embodiment of the disclosure, in addition to the configuration of Item 3, the thin film transistor substrate further includes a black film disposed on the observation surface side of the color filter layer.

[Item 5] In the liquid crystal display device according to further embodiment of the disclosure, in addition to the configuration of Item 1, 2, 3, or 4, the counter substrate further includes a black film disposed on the observation surface side of the reflective layer.

[Item 6] In the liquid crystal display device according to still further embodiment of the disclosure, in addition to the configuration of Item 1, 2, 3, 4, or 5, the thin film transistor substrate further includes a touch panel drive wiring line disposed on the back surface side of the color filter layer.

[Item 7] In the liquid crystal display device according to yet further embodiment of the disclosure, in addition to the configuration of Item 6, the color filter layer is disposed between the touch panel drive wiring line and the metal wiring line.

According to the disclosure, it is possible to provide a horizontal alignment mode liquid crystal display device capable of enhancing brightness and suppressing iridescent reflection.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described in more detail with reference to the accompanying drawings, but the disclosure is not limited to these embodiments.

Definition of Terms

In this specification, the "observation surface side" means a side closer to a screen (display surface) of a liquid crystal display device, and the "back surface side" means a side farther from the screen (display surface) of the liquid crystal display device.

First Embodiment

Figure 1:
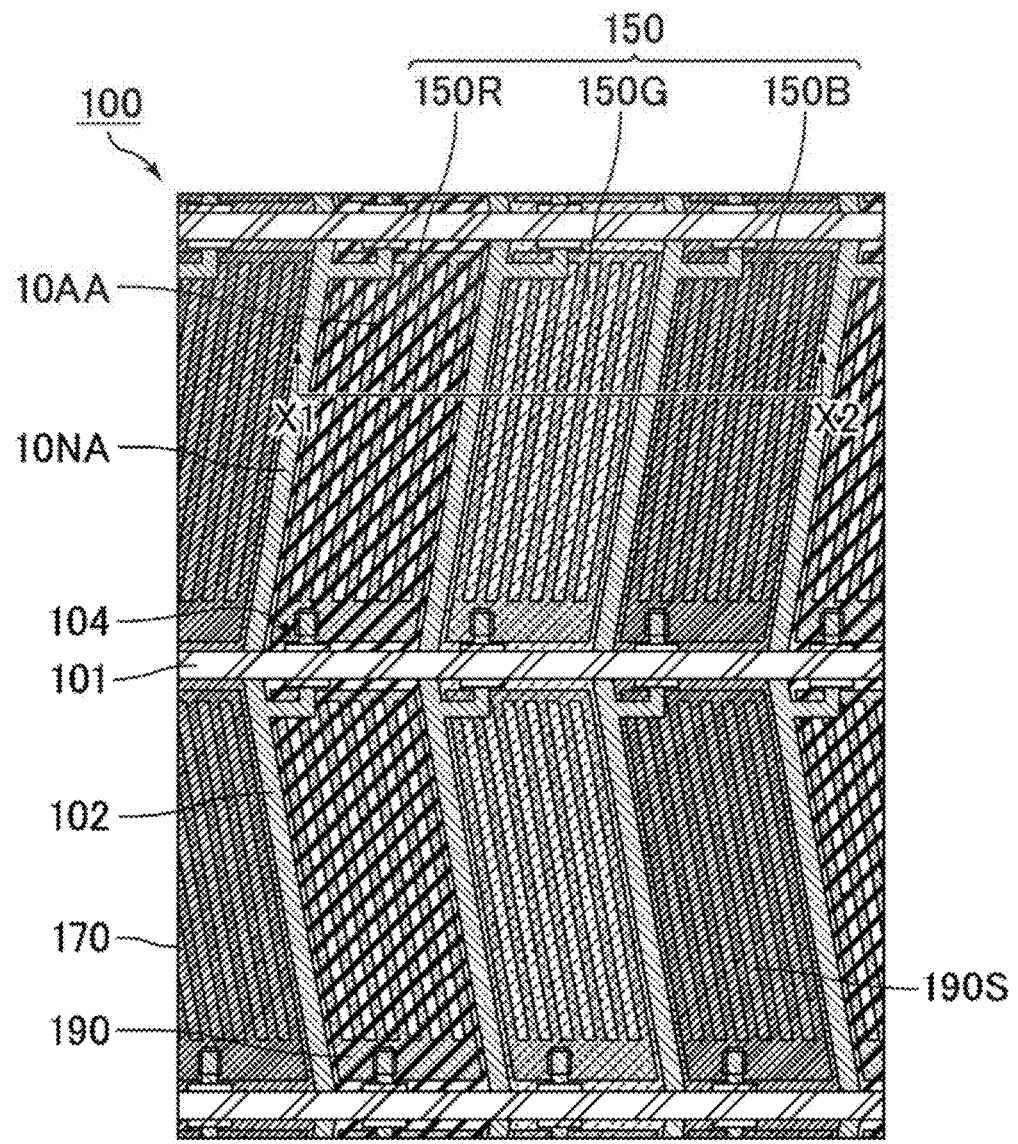
FIG. 1 is a schematic plan view illustrating a pixel configuration of an observation surface side substrate (TFT substrate) included in a liquid crystal display device according to a first embodiment.
Figure 2:
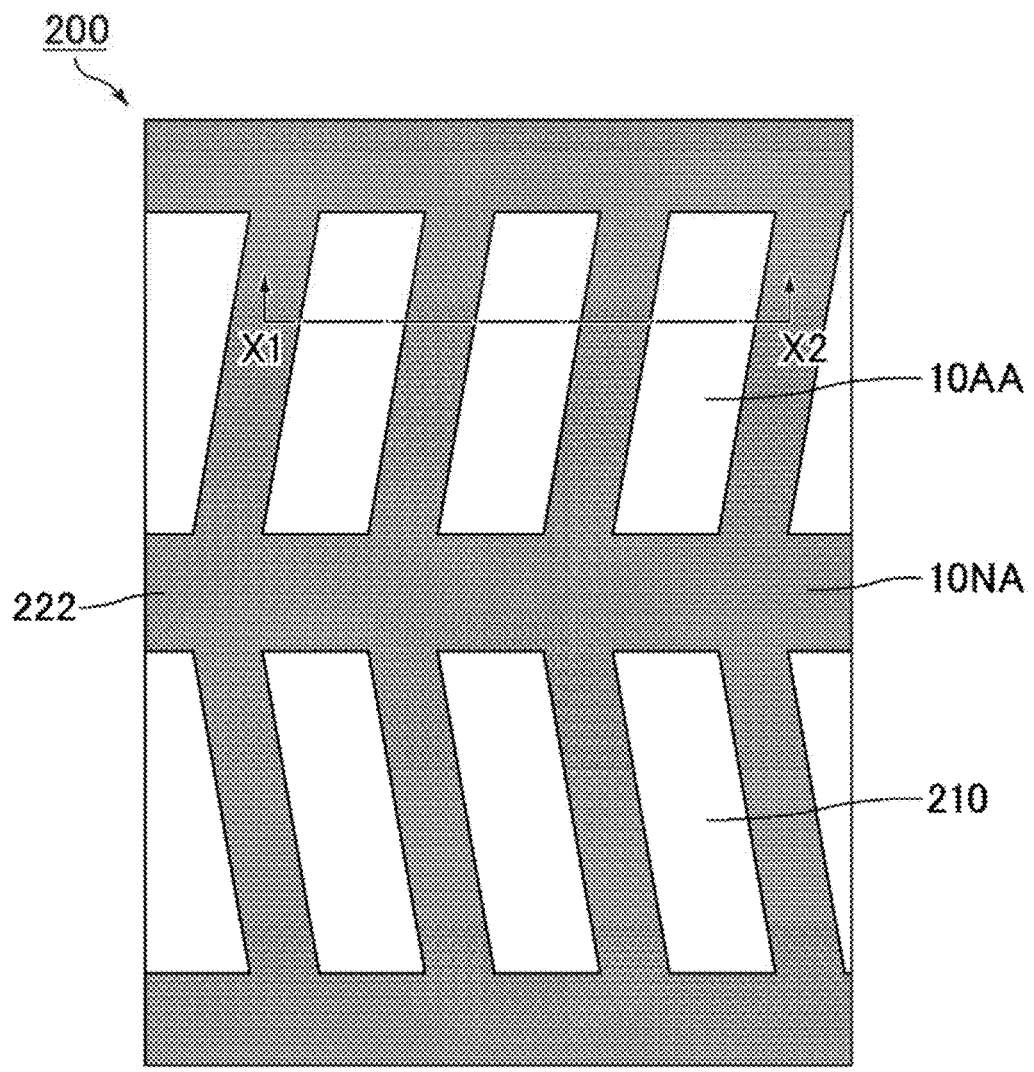
FIG. 2 is a schematic plan view illustrating a pixel configuration of a back surface side substrate (counter substrate) included in the liquid crystal display device according to the first embodiment.
Figure 3:
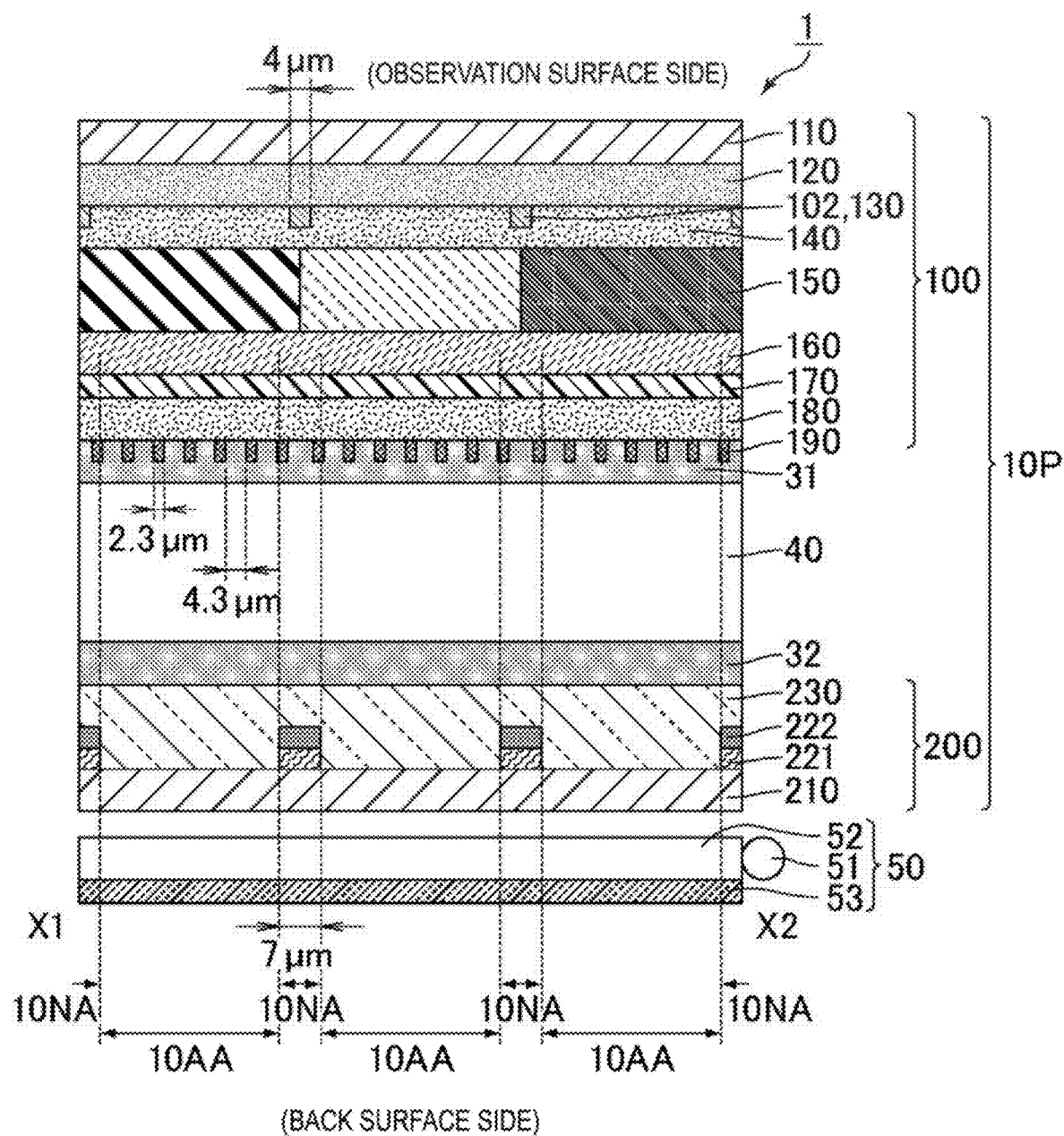
FIG. 3 is a schematic cross-sectional view of the liquid crystal display device according to the first embodiment along lines X1-X2 in FIGS. 1 and 2.

FIG. 1 is a schematic plan view illustrating a pixel configuration of the observation surface side substrate (TFT substrate) included in a liquid crystal display device according to a first embodiment. FIG. 2 is a schematic plan view illustrating a pixel configuration of the back surface side substrate (counter substrate) included in the liquid crystal display device according to the first embodiment. FIG. 3 is a schematic cross sectional view of the liquid crystal display device according to the first embodiment along the lines X1-X2 in FIGS. 1 and 2. FIGS. 1 and 2 are schematic plan views as viewed from the observation surface side, respectively. Lengths of respective components illustrated in FIG. 3 are examples.

As illustrated in FIGS. 1 to 3, the liquid crystal display device 1 according to the present embodiment includes, in order from the observation surface side to the back surface side, a liquid crystal panel 10P including a first linear polarizer, a thin film transistor (TFT) substrate 100, a first alignment film 31, a liquid crystal layer 40, a second alignment film 32, a counter substrate 200, and a second linear polarizer, and a backlight 50 disposed on the back surface side of the liquid crystal panel 10P. Thus, in the present embodiment, of a pair of substrates (the TFT substrate 100 and the counter substrate 200) sandwiching the liquid crystal layer 40, the TFT substrate 100 is disposed on the observation surface side, and the counter substrate 200 is disposed on the back surface side. Hereinafter, a normal configuration of a known liquid crystal display device in which a counter substrate disposed on the observation surface side and the TFT substrate is disposed on the back surface side is also referred to as a "normal configuration" and a configuration in which the TFT substrate is disposed on the observation surface side and the counter substrate is disposed on the back surface side is also referred to as an "inverted configuration".

The liquid crystal display device 1 according to the present, embodiment has the following features [1] and [2].

[1] The counter substrate 200 disposed on the back surface side includes a reflective layer 221 in an area 10NA outside the pixel area. With this feature, light from the backlight 50 incident on the area 10NA outside the pixel area can be reflected to the back surface side by the reflective layer and reused for display. By providing the reflective layer 221 in the inverted configuration, the usage efficiency of light from the backlight is enhanced, thereby enhancing the brightness as compared with the normal configuration.

[2] A color filter layer 150 is disposed on the observation surface side of a second electrode 190 provided with a slit (electrode non-forming portion) 190S. With this feature, the iridescent reflection of external light caused by the second electrode 90 provided with the slit 190S (diffracted light generated by the slit 190S) can be absorbed and attenuated by the color filter layer 150 disposed on the observation surface side of the second electrode 190. Therefore, the iridescent reflection can be suppressed.

In this way, in the liquid crystal display device 1 according to the present embodiment, the color filter layer 150 and the second electrode 190 provided with the slit 190S are disposed in order from the observation surface side to the back surface side. Therefore, the iridescent reflection caused by the second electrode 190 can be suppressed. On the other hand, in the liquid crystal display device of JP 2017-116821 A, a second electrode provided with a slit and a color filter layer are disposed in order from the observation surface side to the back surface side. Therefore, the iridescent reflection of external light caused by the second electrode cannot be absorbed and attenuated by the color filter layer, and thus the iridescent reflection cannot be suppressed.

Hereinafter, respective components of the liquid crystal display device of the present embodiment will be described.

The TFT substrate 100 is a substrate provided with a thin film transistor 104, which is a switching element used for switching on/off of the pixel of the liquid crystal display device 1. In the present embodiment, a configuration of the TFT substrate 100 for an FFS mode will be described.

As illustrated in FIGS. 1 to 3, the TFT substrate 100 includes the TFT 104, and includes, in order from the observation surface side to the back surface side, a support substrate 110, a gate line 101 as an example of the metal wiring line, a gate insulating film 120, a source line 102 as an example of the metal wiring line, a first interlayer insulating film 140, the color filter layer 150, a flattening film 160, a planar first electrode 170, a second interlayer insulating film 180, and the second electrode 190 provided with the slit 190S. According to such a configuration, a transverse electrical field (fringe electrical field) can be generated in the liquid crystal layer 40 by applying a voltage between the first electrode 170 and the second electrode 190 that constitute a pair of electrodes. Thus, by adjusting the voltage applied between the first electrode 170 and the second electrode 190, the alignment of the liquid crystal in the liquid crystal layer 40 can be controlled.

The TFT substrate 100 includes a plurality of gate lines 101 extending parallel to each other on the support substrate 110 and a plurality of source lines 102 extending parallel to each other in a direction intersecting the respective gate lines 101 with the gate insulating film 120 interposed therebetween. The plurality of gate lines 101 and the plurality of source lines 102 are formed in a lattice pattern as a whole so as to partition respective pixels. The TFT 104 as the switching element is arranged at the intersection of each gate line 101 and each source line 102.

Each TFT 104 is coupled to the corresponding gate line 101 of the plurality of gate lines 101 and the corresponding source line 102 of the plurality of source lines 102 and is a three-terminal switch including a gate electrode protruding from the corresponding gate line 101 (which is part of the gate line 101), a source electrode protruding from the corresponding source line 102 (which is part of the source line 102), a drain electrode coupled to the corresponding second electrode 190 of the plurality of second electrodes 190, and a thin film semiconductor layer. The source electrode and the drain electrode are electrodes provided on a source wiring line layer 130 same as the source line 102, and the gate electrode is an electrode provided on a gate wiring line layer same as the gate line 101. Each second electrode 190 is coupled to a corresponding drain electrode.

The thin film semiconductor layer of each TFT 104 is constituted of, for example, a high-resistance semiconductor layer made of amorphous silicon, polysilicon, or the like, and a low-resistance semiconductor layer made of n+ amorphous silicon or the like in which an impurity such as phosphorus is doped in amorphous silicon. Further, as the thin film semiconductor layer, an oxide semiconductor layer made of zinc oxide or the like may be used.

The support substrate 110 is preferably a transparent substrate, and examples thereof include a glass substrate and a plastic substrate.

The gate insulating film 120 is, for example, an inorganic insulating film. As the inorganic insulating film, for example, an inorganic film (relative dielectric constant $\varepsilon=5$ to 7) such as silicon nitride ($SiNx$) or silicon dioxide ($SiO_2$), or a layered film thereof can be used.

The gate wiring line layer and the source wiring line layer 130 are, for example, a single layer or a multilayer of a metal such as copper, titanium, aluminum, molybdenum, or tungsten, or an alloy thereof. The various wiring lines and electrodes constituting the gate line 101, the source line 102, and the TFT 104 can be formed by forming a metal such as copper, titanium, aluminum, molybdenum, or tungsten, or an alloy of thereof in a single layer or a multilayer by a sputtering method or the like, and then patterning the metal film by a photolithography method or the like. By using the same material for these various wiring lines and electrodes that are formed in the same layer, the manufacture efficiently is improved.

The first interlayer insulating film 140 and the second interlayer insulating film 180 are, for example, inorganic insulating films. As the inorganic insulating film, for example, an inorganic film (relative dielectric constant $\varepsilon=5$ to 7) made of silicon nitride ($SiNx$) or silicon dioxide ($SiO_2$), or a layered film thereof can be used.

The color filter layer 150 has a configuration in which a red color filter 150R, a green color filter 150G, and a blue color filter 150B are arranged in a plane. The red color filter 150R, the green color filter 150G, and the blue color filter 150B are each constituted of, for example, a transparent resin containing a pigment. Normally, a combination of the red color filter 150R, the green color filter 150G, and the blue color filter 150B is arranged in all pixels. A desired color can be obtained in each pixel by mixing colors while controlling the amounts of color lights transmitted through the red color filter 150R, the green color filter 150G, and the blue color filter 150B, respectively. Note that the thicknesses of the red color filter 150R, the green color filter 150G, and the blue color filter 150B may not be the same. In other words, a surface of the color filter layer 150 on the liquid crystal layer 40 side may not be flat.

The flattening film 160 has a function of leveling the surface of the TFT substrate 100 on the liquid crystal layer 40 side. The flattening film 160 is, for example, an organic insulating film. As the organic insulating film, for example, an organic film having a small relative dielectric constant (relative dielectric constant ε=2 to 5) made of a photosensitive acrylic resin, or a layered film thereof can be used.

Specific examples of the organic insulating film include organic films such as acrylic resin, polyimide resin, and novolac resin, and layered bodies thereof.

The first electrode 170 is a planar electrode. The planar electrode is specifically an electrode that covers at least one entire pixel area in a planar manner. The planar electrode may cover at least one entire pixel area in a planar manner, and the area outside the pixel area may or may not be covered by the planar electrode. The first electrode 170 of the present embodiment covers an entire pixel area 10AA in a planar manner.

The first electrode 170 of the present embodiment functions as a common electrode. The first electrode 170 is an electrode formed in almost the entire area regardless of the pixel boundary, except for a specific portion located in the area 10NA outside the pixel area. The specific portion is, for example, a coupling portion between a pixel electrode and the drain electrode. A common signal held at a constant value is supplied to the first electrode 170, and the first electrode 170 is held at a constant electric potential.

Each second electrode 190 functions as the pixel electrode. The pixel electrode is an electrode arranged in each area (pixel area 10AA) surrounded by two gate lines 101 adjacent to each other and two source lines 102 adjacent to each other. Each second electrode 190 is arranged so as to overlap the corresponding pixel area 10AA. The second electrode 190 is electrically coupled to the corresponding source line 102 via the thin film semiconductor layer provided in the TFT 104. The second electrode 190 is set to a potential corresponding to a data signal supplied via the corresponding TFT 104. Here, the pixel area is an area corresponding to one pixel electrode, and may be called a "pixel" in the technical field of liquid crystal display devices. When one pixel is split to drive, the pixel area may be called a "subpixel", a "dot", or a "picture element".

The second electrode 190 is an electrode provided with the slit 190S. The electrode provided with the slit is specifically an electrode provided with a slit in at least one pixel area. When the slit 190S provided in the second electrode 190 has a fine periodic structure on the order of several µm to several hundred µm, iridescent diffraction is likely to occur. The electrode provided with the slit may be provided with the slit in at least one pixel area, and may or may not be provided with the slit in the area outside the pixel area.

The second electrode 190 is provided with a plurality of slits 190S parallel to each other. The slits 190S are provided so as to be inclined to the initial orientation direction of the liquid crystal molecules. The slits 190S provided in the second electrode 190 have an angle with the initial orientation direction of the liquid crystal molecules, so that the liquid crystal molecules can be rotated in a certain direction.

Therefore, the alignment of the liquid crystal molecules can be controlled by voltage control.

In the present embodiment, an aspect has been described in which the second electrode 190 provided with the slits 190S functioning as the pixel electrode is disposed on the planar first electrode 170 functioning as the common electrode with the second interlayer insulating film 180 interposed therebetween. However, the positions of the common electrode and the pixel electrode may be exchanged.

In this case, the TFT substrate 100 includes a plurality of planar first electrodes 170 disposed in each area surrounded by two gate lines 101 adjacent to each other and two source lines 102 adjacent to each other, and includes the second electrode 190 formed in almost the entire area and provided with the slits, regardless of the pixel boundary, except for a specific portion located in the area 10NA outside the pixel area. In other words, the second electrode 190 provided with the slits functioning as the common electrode is disposed on the plurality of planar first electrodes 170 functioning as the pixel electrodes with the second interlayer insulating film 180 interposed therebetween.

Examples of the material of the first electrode 170 and the second electrode 190 include indium tin oxide (ITO) and indium zinc oxide (IZO).

The thin film transistor substrate 100 of the present embodiment illustrated in FIG. 3 includes, in order from the observation surface side to the back surface side, the source line 102 as the metal wiring line, the color filter layer 150, and the pair of electrodes (the first electrode 170 and the second electrode 190). However, the arrangement relationship between the metal wiring line, the color filter layer 150, and the pair of electrodes is not limited to this.

The first alignment film 31 and the second alignment film 32 have a function of controlling the alignment of the liquid crystal molecules contained in the liquid crystal layer 40. When the voltage applied to the liquid crystal layer 40 is less than the threshold voltage (including no voltage applied), the long axis of the liquid crystal molecules in the liquid crystal layer 40 is controlled so as to be aligned horizontally to the first alignment film 31 and the second alignment film 32 mainly by the action of the first alignment film 31 and the second alignment film 32.

Here, "the long axis of the liquid crystal molecules in the liquid crystal layer 40 is aligned horizontally to the first alignment film 31 and the second alignment film 32" means that the tilt angle (including the pre-tilt angle) of the liquid crystal molecules is, to the first alignment film 31 and the second alignment film 32, from 0° to 5°, preferably 0° to 3°, and more preferably 0° to 1°. The tilt angle of the liquid crystal molecules means an angle at which the long axis (optical axis) of the liquid crystal molecules is tilted to the surfaces of the first polarizer and the second polarizer.

The first alignment film 31 and the second alignment film 32 are layers that have been subjected to alignment treatment for controlling the alignment of the liquid crystal molecules. For the first alignment film 31 and the second alignment film 32, an alignment film made of polyimide or like, which is commonly used in the field of liquid crystal display devices, can be used. Examples of the material of the first alignment film 31 and the second alignment film 32 include polymers having a main chain such as polyimide, polyamic acid, and polysiloxane, and a photoalignment film material having a photoreactive site (functional group) in the main chain or side chain is suitably used.

The liquid crystal layer 40 contains the liquid crystal molecules that are horizontally aligned to the TFT substrate 100 when no voltage is applied. The amount of light transmitted is controlled by changing the alignment of the liquid crystal molecules in accordance with the electric field generated in the liquid crystal layer 40 due to the voltage applied between the first electrode 170 and the second electrode 190 that constitute the pair of electrodes. When no voltage is applied between the pair of electrodes provided in the TFT substrate 100 (when no voltage is applied), the liquid crystal molecules in the liquid crystal layer 40 are horizontally aligned by the restrictive force of the first alignment film 31 and the second alignment film 32. When a voltage is applied between the pair of electrodes (when a voltage is applied), the liquid crystal molecules in the liquid crystal layer 40 rotate in the in-plane direction in accordance with the transverse electrical field generated in the liquid crystal layer 40.

The liquid crystal molecules have an anisotropy of dielectric constant ($\Delta\varepsilon$) defined by the following equation, and the anisotropy of dielectric constant ($\Delta\varepsilon$) may be a positive value or a negative value. The liquid crystal layer 40 in the present embodiment contains liquid crystal molecules in which $\Delta\varepsilon$ has a negative value. Note that the liquid crystal molecule having a positive anisotropy of dielectric constant is also called a positive liquid crystal, and the liquid crystal molecule having a negative anisotropy of dielectric constant is also called a negative liquid crystal. Note that the long axis direction of the liquid crystal molecule is the direction of the slow axis.

$$\Delta\varepsilon=\text{(dielectric constant in the long axis direction)}-\text{(dielectric constant in the short axis direction)}$$

When the liquid crystal layer 40 includes a negative liquid crystal, the slow axis of the liquid crystal layer 40 preferably forms an angle of approximately 0° to the absorption axis of the first linear polarizer. On the other hand, when the liquid crystal layer 40 includes a positive liquid crystal, the slow axis of the liquid crystal layer 40 preferably forms an angle of approximately 90° to the absorption axis of the first linear polarizer.

The counter substrate 200 includes, in order from the back surface side to the observation surface side, a support substrate 210, the reflective layer 221, a black film 222, and an overcoat layer 230.

The support substrate 210 is preferably a transparent substrate, and examples thereof include a glass substrate and a plastic substrate.

The reflective layer 221 and the black film 222 are provided on the support substrate 210 in a lattice pattern so as to correspond to the gate lines 101 and the source lines 102, and are disposed in the area 10NA outside the pixel area. The reflective layer 221 and the black film 222 overlap each other.

The reflective layer 221 is not limited to a spec reflective layer as long as the reflective layer 221 reflects incident light from the backlight 50 to the back surface side. The reflective layer 221 is preferably formed of a material having a reflectance higher than an absorption rate for the light from the backlight 50, and examples thereof include a reflective metal layer. Examples of the reflective metal layer include a single layer metal film, a dielectric multilayer film (enhanced reflective film) in which a high-refractive-index layer such as $Ta_2O_3$ and a low-refractive-index layer such as $MgF_2$ are layered, and a film in which a single layer metal film and an enhanced reflective film are layered. The metal is preferably a highly reflective metal, and examples of the highly reflective metal include Al and Ag. The reflective layer 221 can be formed into a black matrix pattern by, for example, forming an enhanced reflective film or the like on the support substrate 210 using a sputtering device or the like and then etching the formed film.

The reflective layer 221 may be a reflective layer containing a cholesteric liquid crystal. The reflective layer containing the cholesteric liquid crystal can be produced, for example, by the following method. First, an alignment film is formed on the support substrate 210, and the alignment film is subjected to photo-alignment treatment. Thereafter, a polymerizable solution is applied onto the alignment film and dried to form a coating film. Then, the part other than the black matrix pattern is masked, irradiated with ultraviolet light, and then fired. Subsequently, after the part, other than the black matrix pattern is masked, further irradiated with ultraviolet light to develop, by drying, the reflective layer 221 containing cholesteric liquid crystal with the black matrix pattern can be formed.

The polymerizable solution may contain, for example, a polymerizable liquid crystal compound, a chiral agent, a polymerization initiator, and a solvent. In order to adjust the surface tension of the coating film to which the polymerizable solution has been applied, a surfactant, may be further added.

The polymerizable liquid crystal compound preferably has, for example, a double refraction $\Delta n$ (=ne−no) of 0.18 or greater. The double refraction of the polymerizable liquid crystal compound is more preferably from 0.18 to 0.40, and still more preferably from 0.18 to 0.22. $\Delta n$ can be measured by a Senarmont method.

Note that the reflective layer 221 containing the cholesteric liquid crystal may be a layered body of two or more layers, each reflecting light of a different wavelength. For example, a layered body with a layer that reflects red light, a layer that reflects green light, and a layer that reflects blue light can be used. Further, when a reflective layer containing the cholesteric liquid crystal is used as the reflective layer 221, it is preferable that the light incident on the reflective layer containing the cholesteric liquid crystal be circularly polarized light, and it is preferable to provide a circular polarizer on the backlight side of the reflective layer 221.

In a plan view, a width of the reflective layer 221 wider than a width of the metal wiring line (for example, the source line 102) overlapping the reflective layer 221. With such an aspect, brightness can be further enhanced. In a liquid crystal display device having a normal configuration (non-inverted), it is conceivable to enhance brightness by changing the material of the source line and the gate line to aluminum with large reflectance and widening the line widths of the source line and the gate line. However, widening the line widths of the source line and the gate line leads to an increase in parasitic capacitance of the wiring line, so that it may not be able to drive the TFT when the liquid crystal panel is a high definition one. In the present embodiment, by applying the inverted configuration, providing the reflective layer 221 as a layer different from the source line and the gate line, which is not related to driving the TFT, and making (widening) the width of the reflective layer 221 wider than the width of the metal wiring line overlapping the reflective layer 221, the brightness can be enhanced while enabling the TFT to be driven even when the liquid crystal panel is a high definition one.

The counter substrate 200 of the present embodiment includes the black film 222 disposed on the observation surface side of the reflective layer 221. With such an aspect, it is possible to suppress the reflection of the external light incident from the observation surface side by the reflective layer 221, so that the reflection of external light can be further suppressed. In addition, since the external light incident from the observation surface side is absorbed by the black film 222, it is possible to prevent the external light from being reflected to the TFT 104. As a result, the generation of light leakage current is suppressed, so that the contrast of the display screen can be enhanced and the image quality can be favorable.

The black film 222 is provided at the pixel boundary so as to overlap with the metal wiring lines (for example, the gate line 101 and the source line 102). With such an aspect, the black film 222 functions as a black matrix layer to prevent oblique-view color mixture. Here, the pixel boundary is an area sandwiched by pixel areas adjacent to each other.

In a normal liquid crystal display device in which both a color filter layer and a black matrix layer are provided in a counter substrate disposed on the observation surface side and an electrode with slits is provided in the TFT substrate disposed on the back surface side, the color filter layer is disposed between the black matrix layer and the electrode provided with the slits. On the other hand, in the present embodiment, the TFT substrate 100 disposed on the observation surface side includes the color filter layer 150 and the second electrode 190 provided on the back surface side of the color filter layer 150, and the counter substrate 200 disposed on the back surface side includes the black film 222 provided at the pixel boundary so as to overlap the metal wiring lines. With this configuration, the color filter layer 150 is not disposed between the black film 222 that functions as the black matrix layer and the second electrode 190, and the distance between the black film 222 and the second electrode 190 is smaller than that of the normal liquid crystal display device. As a result, it is possible to suppress the oblique-view color mixture as compared with the normal liquid crystal display device.

Further, in a plan view, the width of the black film 222 is wider than the width of the metal wiring line overlapping the black film 222. With such an aspect, it is possible to sufficiently suppress the oblique-view color mixture.

In a plan view, the width of the black film 222 is the same as the width of the reflective layer 221 on which the black film 222 overlaps. With such an aspect, it is possible to effectively suppress the reflection of external light by the reflective layer 221 while suppressing a decrease in the aperture ratio.

The black film 222 is in contact with the observation surface side of the reflective layer 221, but another layer may be disposed between the black film 222 and the reflective layer 221.

The black film 222 is preferably formed of a material having a higher absorption rate than a reflectance for the external light incident from the observation surface side, and preferably has an absorption rate of 80% or greater for the external light. Examples of the black film 222 include a metal oxide film and a resin film. Examples of the metal oxide film include a two-layer film of chromium (Cr) and chromium oxide (CrOx). Examples of the resin film include black resist. The material of the black resist is preferably a black photosensitive resin, and examples thereof include a black photosensitive acrylic resin.

The overcoat layer 230 has a function of leveling the surface of the counter substrate 200 on the liquid crystal layer 40 side. For example, an organic film (dielectric constant $\varepsilon=3$ to 4) can be used for the overcoat layer 230. The overcoat layer 230 is formed by, for example, applying a photo-curable resin, irradiating the applied resin with ultraviolet light, and firing the irradiated resin.

As the first linear polarizer and the second linear polarizer, for example, a polarizing plate (absorbing polarizer) or the like in which an anisotropic material such as an iodine complex (or dye) is dyed and adsorbed on a polyvinyl alcohol (PVA) film and then stretch-oriented can be used. Note that, usually, in order secure mechanical strength and resistance to moisture and heat, protection films such as triacetyl cellulose (TAC) films are laminated on both sides of the PVA film, for practical use.

It is preferable that the absorption axis of the first linear polarizer and the absorption axis of the second linear polarizer be orthogonal to each other. According such a configuration, since the first linear polarizer and the second linear polarizer are disposed in the crossed-Nicol, a good black display state can be obtained when no voltage is applied. In this specification, the orientation of the absorption axis of the first linear polarizer is defined as 0° for description. In this case, the orientation of the absorption axis of the second linear polarizer is preferably set to 90°.

In this specification, "the two axes (directions) are orthogonal" means that an angle (absolute value) formed by the two axes is in a range of 90°±3°, preferably in a range of 90°±1°, more preferably in a range of 90°±0.5°, and particularly preferably 90° (completely orthogonal). Further, in this specification, "the two axes (directions) are parallel" means that an angle (absolute value) formed by the two axes is in a range of 0°±3°, preferably in a range of 0°±1°, more preferably in a range of 0°±0.5°, and particularly preferably 0° (completely parallel).

In the present embodiment, a reflective polarizer may be provided on the back surface side of the second linear polarizer. As the reflective polarizer, for example, a multilayer reflective polarizer, a nanowire grid polarizer, or a reflective polarizer using a selective reflection of cholesteric liquid crystals may be used. Examples of the multilayer reflective polarizer include a reflective polarizer (trade name: DBEF) available from 3M Company. Examples of the nanowire grid polarizer include those disclosed in JP 2006-201782 A and JP 2005-195824 A. Examples of the reflective polarizer using the selective reflection of cholesteric liquid crystals include a reflective polarizer (trade name: PCF) available from Nitto Denko Cooperation. The reflective polarizer can be disposed so that the reflection axis is oriented at 90°.

The backlight 50 is not limited to a specific backlight as long as the backlight irradiates the liquid crystal panel 10P with light, and may be a direct type, an edge type, or any other type. The backlight 50 of the present embodiment is an edge type, and includes a light source 51, a light guide plate 52, and a reflector 53 as illustrated in FIG. 3. As the light guide plate 52, one commonly used in the field of liquid crystal display devices can be used. As the backlight 50, an optical sheet such as a diffuser plate or a prism sheet can be appropriately used.

The light source 51 is not limited to a specific light source as long as the light source emits light including visible light, and may be any light source that emits light, including only visible light, or any light source that emits light including both visible light and ultraviolet light. In order to enable color display by the liquid crystal display device 1, a light source that emits white light is suitably used. As a type of the light source 51, for example, a cold cathode fluorescent lamp (CCFL), a light emitting diode (LED), or the like is suitably used. Note that, in the present specification, "visible light" means light (electromagnetic wave) having a wavelength that is greater than or equal to 380 nm and less than 800 nm.

The reflector 53 is not limited to a specific reflector as long as the reflector can reflect the recycled light emitted from the light source 51 and reflected by the reflective layer 221, toward the liquid crystal layer 40 side again. In particular, since the recycled light reflected by the reflective layer 221 can be returned to the liquid crystal layer 40 side again while maintaining the polarization, an Al reflector having a large proportion of regular reflection component in the reflected light (high specular gloss) is preferably used. When a surface of the reflector 53 is uneven, the light emitted from the light source 51 is scattered on the surface of the reflector 53 and is depolarized, so that the amount of light absorbed by the second linear polarizer 12 increases, thereby reducing the recycling effect. Note that, by providing a reflection function on the back surface of the light guide plate 52, the light guide plate 52 may have both a function as a light guide plate and as a reflector.

In addition to the liquid crystal panel 10P and the backlight 50, the liquid crystal display device 1 of the present embodiment includes a plurality of components such as external circuits such as a tape carrier package (TOP) and a printed circuit board (POE), optical films such as a wide viewing angle film and a brightness enhancement film, and a bezel (frame). Some components may be incorporated into another component. Components other than those described above are not particularly limited to specific components and, because such components can be those commonly used in the field of liquid crystal display devices, descriptions thereof are omitted.

Second Embodiment

In the present embodiment, features specific to the present embodiment will be mainly described, and the description of the contents that overlap with the above-described embodiment will be omitted. The liquid crystal display device according to the present embodiment has configurations similar to the liquid crystal display device 1 according to the first embodiment except that, the counter substrate 200 includes a black film on the observation surface side of the gate line 101 and the source line 102 as the metal wiring lines.

Figure 4:
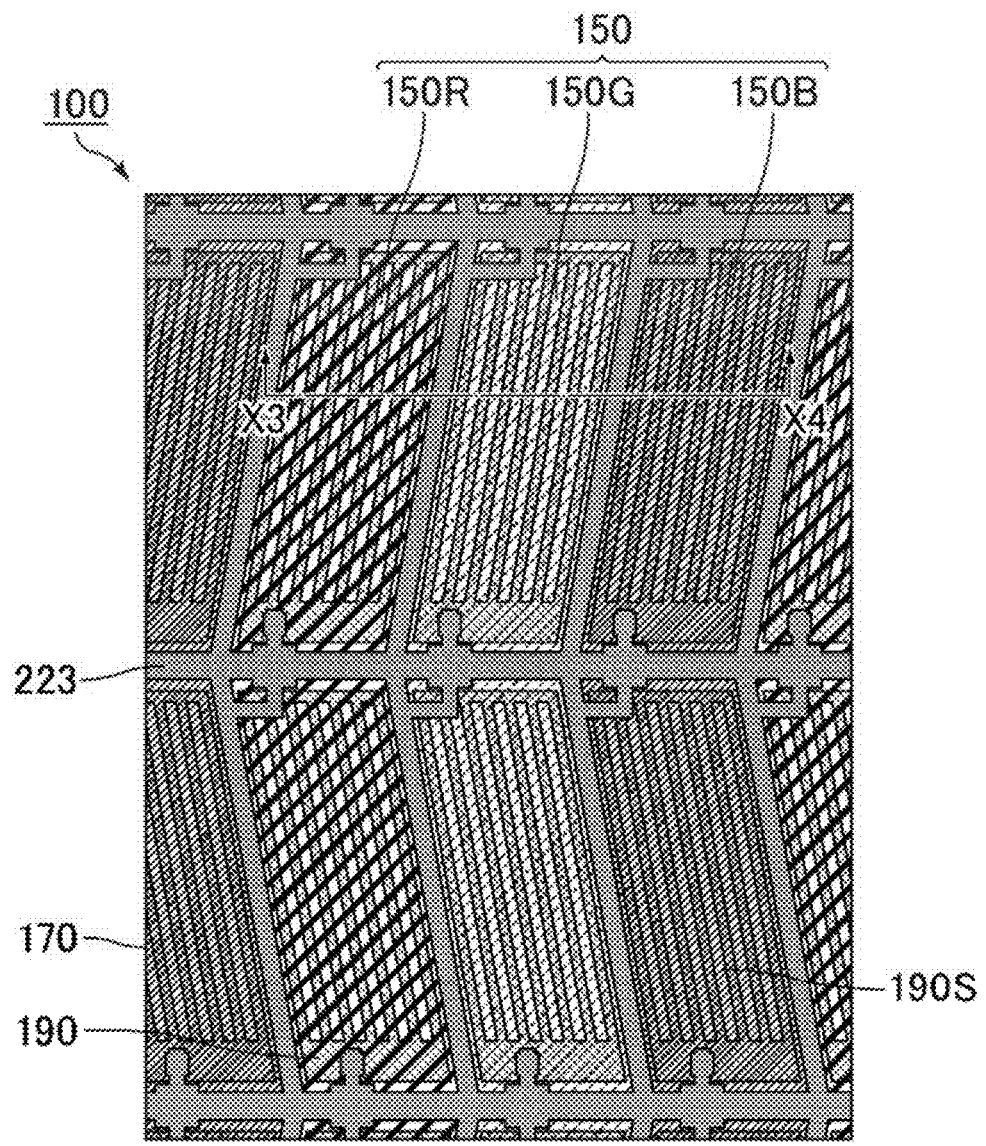
FIG. 4 is a schematic plan view illustrating a pixel configuration of an observation surface side substrate (TFT substrate) included in a liquid crystal display device according to a second embodiment.
Figure 5:
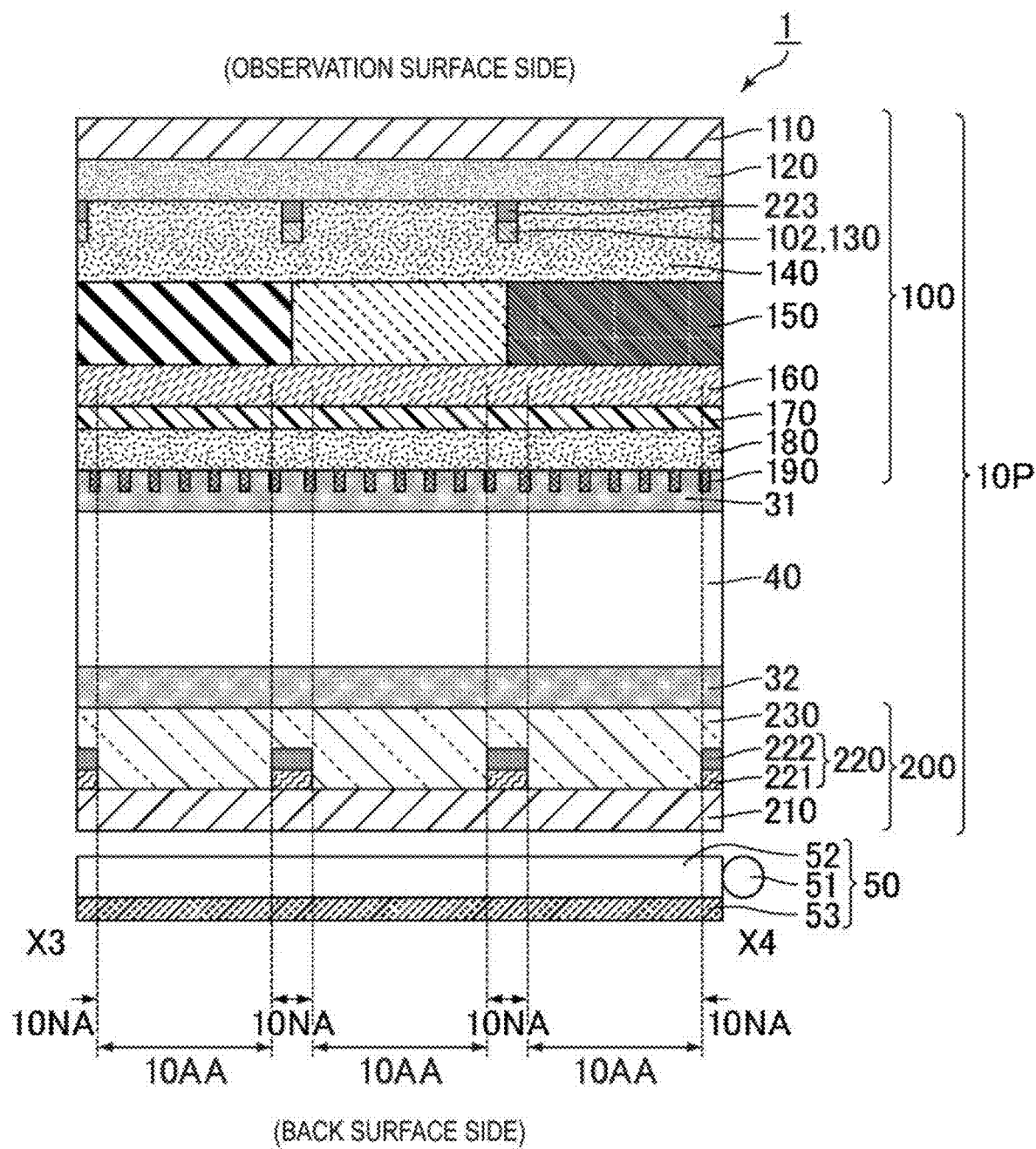
FIG. 5 is a schematic cross-sectional view of the liquid crystal display device according to the second embodiment along line X3-X4 in FIG. 4.

FIG. 4 is a schematic plan view illustrating a pixel configuration of an observation surface side substrate (TFT substrate) included in a liquid crystal display device according to a second embodiment. FIG. 5 is a schematic cross-sectional view of the liquid crystal display device according to the second embodiment along the line X3-X4 in FIG. 4. FIG. 4 is a schematic plan view as viewed from the observation surface side. A schematic plan view of a back surface side substrate (counter substrate) included in the liquid crystal display device according to the second embodiment is similar to that of FIG. 2.

As illustrated in FIGS. 4 and 5, the TFT substrate 100 included in the liquid crystal display device 1 according to the present embodiment includes a black film 223 disposed on the observation surface side of the metal wiring lines such as the source line 102. With such an aspect, it is possible to suppress the reflection of the external light incident from the observation surface side by the metal wiring lines, so that the reflection of external light can be further suppressed.

The black film 223 overlaps the metal wiring lines. With such an aspect, it is possible to further suppress the reflection of external light while suppressing a decrease in the aperture ratio.

In a plan view, a width of the black film 223 is the same as the width of the metal wiring on which the black film 223 overlaps. With such an aspect, it is possible to effectively suppress the reflection of external light by the metal wiring lines while suppressing a decrease in the aperture ratio.

The black film 223 is in contact with the observation surface side of the metal wiring lines, but another layer may be disposed between the black film 223 and the metal wiring lines.

The black film 223 is preferably formed of a material having a higher absorption rate than a reflectance for the external light incident from the observation surface side, and preferably has an absorption rate of 80% or greater for the external light. Examples of the black film 223 include a metal nitride film and a resin film. Examples of the material of the metal nitride film include titanium nitride (TiN). Examples of the resin film include black resist. The material of the black resist is preferably a black photosensitive resin, and examples thereof include a black photosensitive acrylic resin.

Third Embodiment

In the present embodiment, features specific to the present embodiment will be mainly described, and the description of the contents that overlap with the above-described embodiment will be omitted. The liquid crystal display device according to the present embodiment has configurations similar to the liquid crystal display device 1 according to the first embodiment except that the color filter layer 150 is disposed on the observation surface side of the gate line 101 and the source line 102 as the metal wiring lines.

Figure 6:
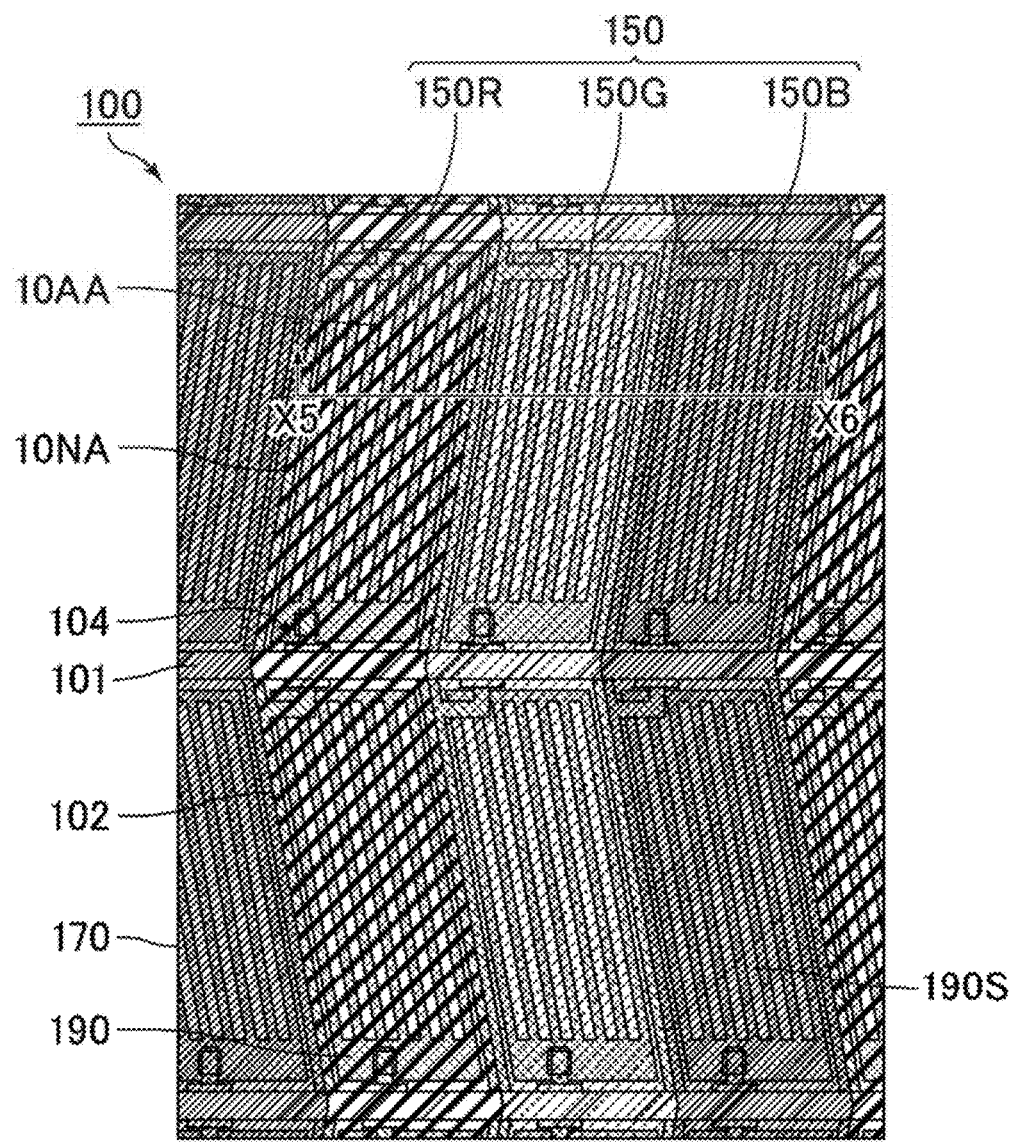
FIG. 6 is a schematic plan view illustrating a pixel configuration of an observation surface side substrate (TFT substrate) included in a liquid crystal display device according to a third embodiment.
Figure 7:
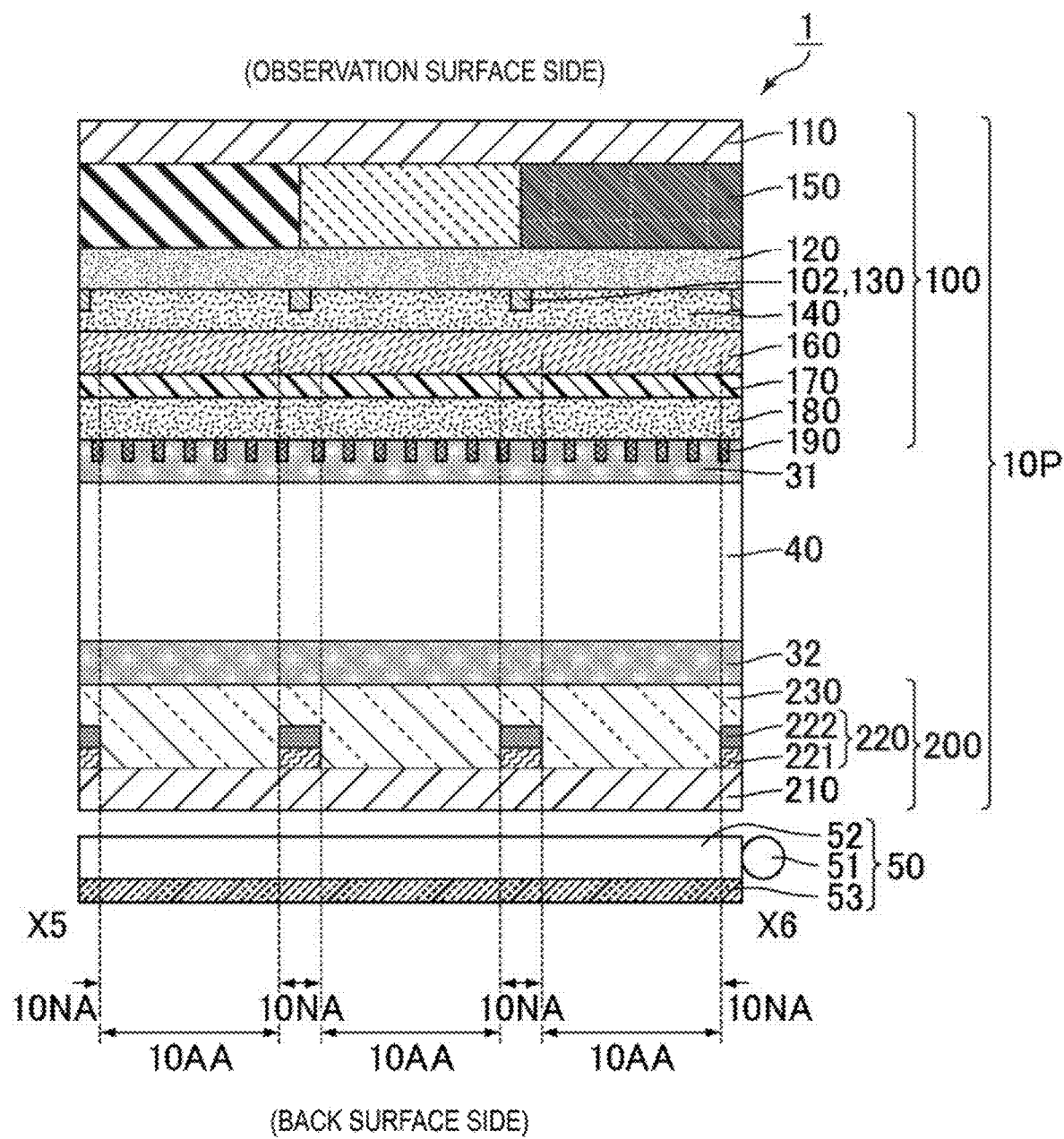
FIG. 7 is a schematic cross-sectional view of the liquid crystal display device according to the third embodiment along a line X5-X6 in FIG. 6.

FIG. 6 is a schematic plan view illustrating a pixel configuration of an observation surface side substrate (TFT substrate) included in a liquid crystal display device according to a third embodiment. FIG. 7 is a schematic cross-sectional view of the liquid crystal display device according to the third embodiment along the line X5-X6 in FIG. 6. FIG. 6 is a schematic plan view as viewed from the observation surface side. A schematic plan view of a back surface side substrate (counter substrate) included in the liquid crystal display device according to the third embodiment is similar to that of FIG. 2.

As illustrated in FIGS. 6 and 7, the color filter layer 150 included in the liquid crystal display device 1 according to the present embodiment is disposed on the observation surface side of the metal wiring lines such as the source line 102. With such an aspect, not only the iridescent reflection of the external light caused by the second electrode 190 but also the external light reflection caused by the metal wiring line can be absorbed and attenuated by the color filter layer 150, so that the reflection of external light can be suppressed.

Fourth Embodiment

In the present embodiment, features specific to the present embodiment will be mainly described, and the description of the contents that overlap with the above-described embodiment will be omitted. The liquid crystal display device according to the present, embodiment has configurations similar to the liquid crystal display device 1 according to the first embodiment except that the color filter layer 150 is disposed on the observation surface side of the gate line 101 and the source line 102 as the metal wiring lines, the counter substrate 200 does not include the black film 222 disposed on the observation surface side of the reflective layer 221, and the TFT substrate 100 includes a black film disposed on the observation surface side of the color filter layer 150.

Figure 8:
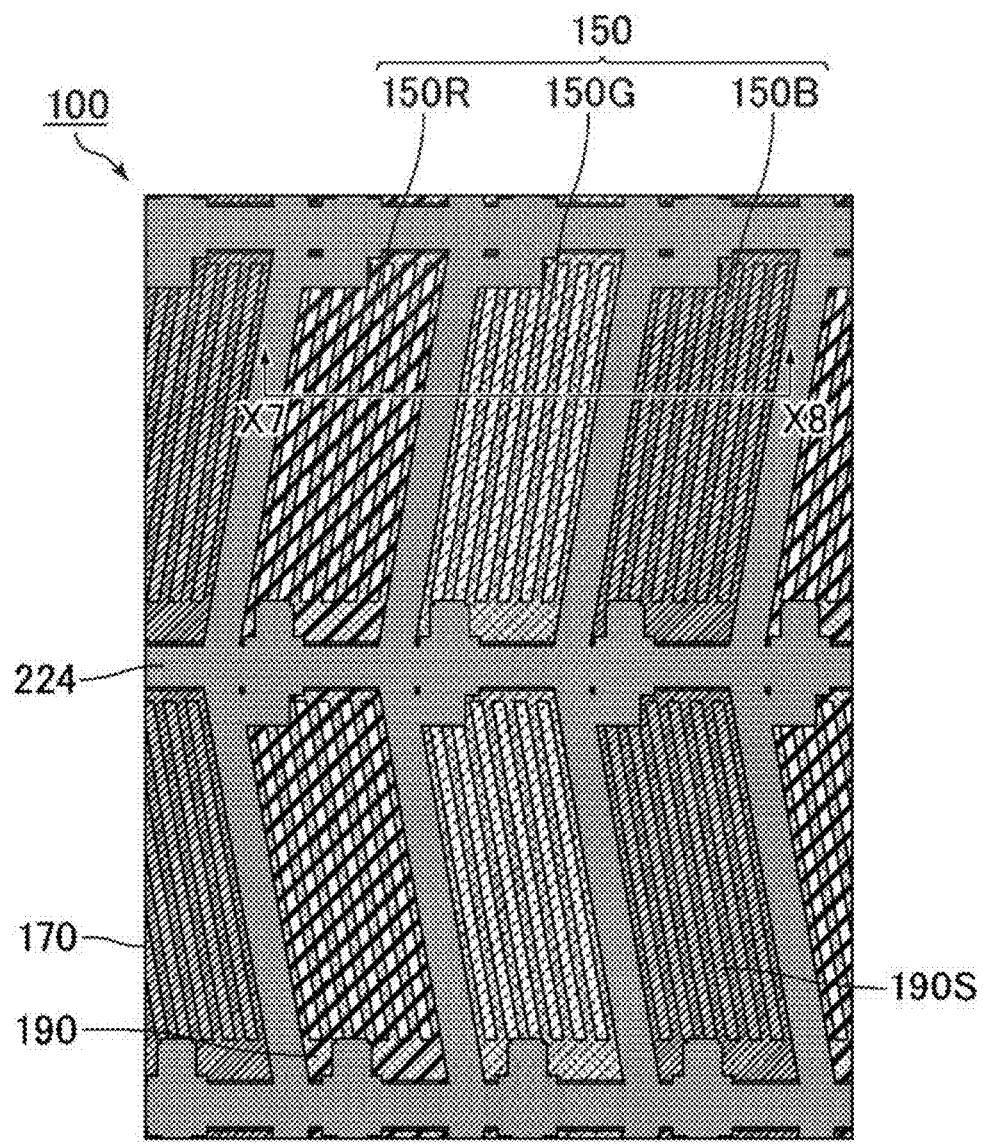
FIG. 8 is a schematic plan view illustrating a pixel configuration of an observation surface side substrate (TFT substrate) included in a liquid crystal display device according to a fourth embodiment.
Figure 9:
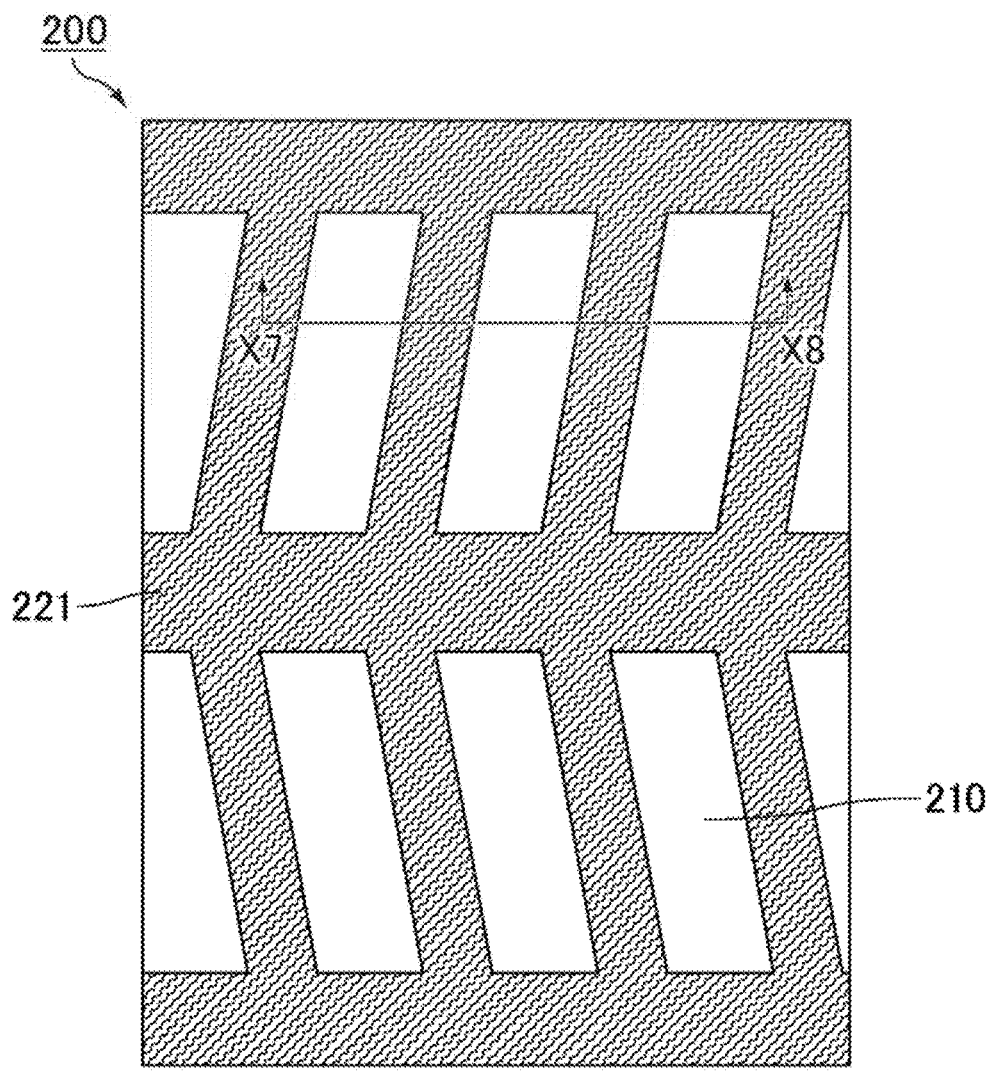
FIG. 9 is a schematic plan view illustrating a pixel configuration of a back surface side substrate (counter substrate) included in the liquid crystal display device according to the fourth embodiment.
Figure 10:
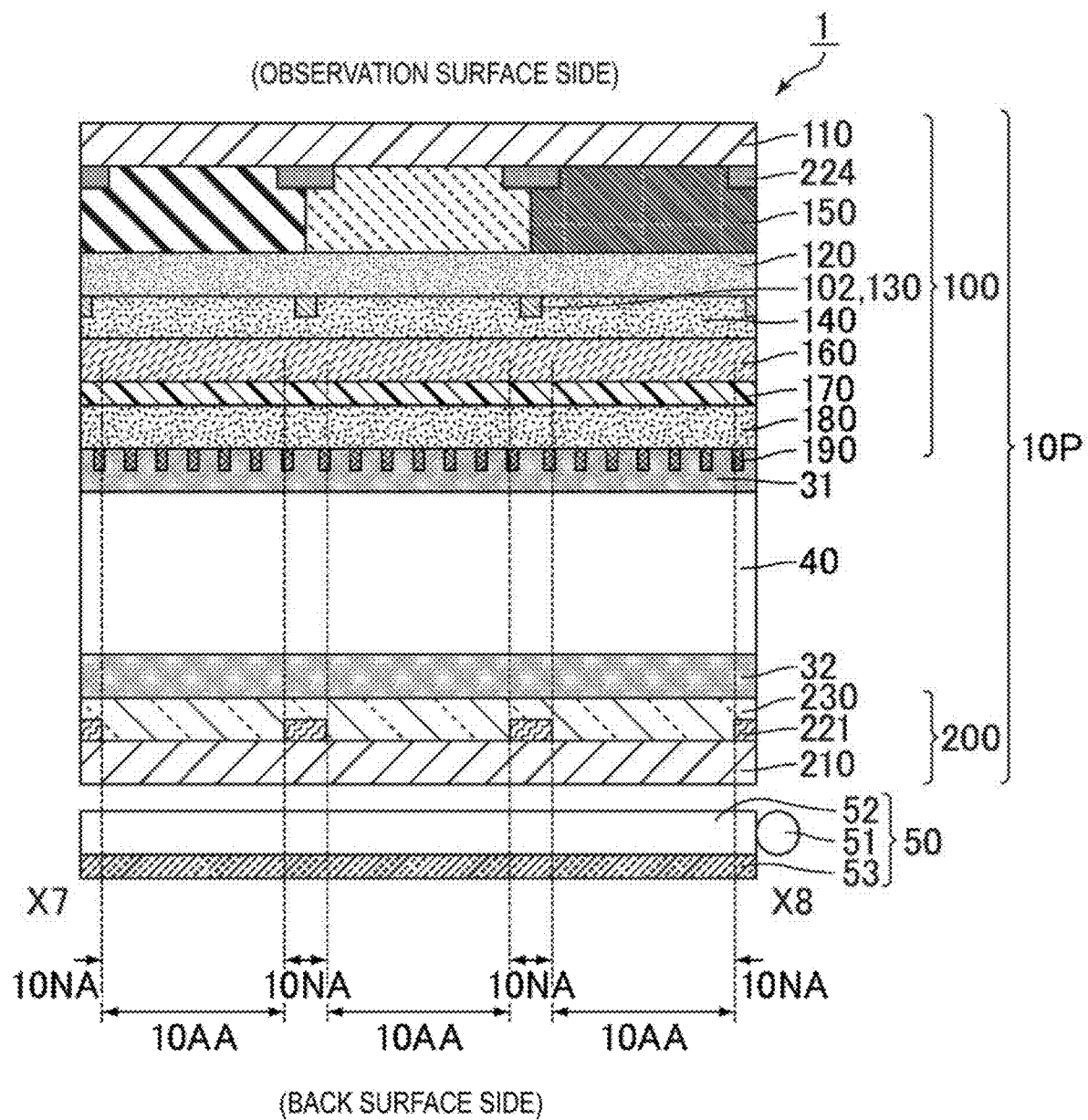
FIG. 10 is a schematic cross-sectional view of the liquid crystal display device according to the fourth embodiment along lines X7-X8 in FIGS. 8 and 9.

FIG. 8 is a schematic plan view illustrating a pixel configuration of an observation surface side substrate (TFT substrate) included in a liquid crystal display device according to a fourth embodiment. FIG. 9 is a schematic plan view illustrating a pixel configuration of a back surface side substrate (counter substrate) included in the liquid crystal display device according to the fourth embodiment. FIG. 10 is a schematic cross sectional view of the liquid crystal display device according to the fourth embodiment along the lines X7-X8 in FIGS. 8 and 9. FIGS. 8 and 9 are schematic plan views as viewed from the observation surface side, respectively.

In the liquid crystal display device 1 according to the present embodiment illustrated in FIGS. 8 to 10, the color filter layer 150 is disposed on the observation surface side of the metal wiring lines such as the source line 102, and the TFT substrate 100 includes a black films 224 disposed at a color boundary on the observation surface side of the color filter layer 150. With such an aspect, oblique-view color mixture can be prevented. Here, the "color boundary" means a boundary between color filters of different colors.

The black film 224 is provided at the pixel boundary so as to overlap with the metal wiring lines (for example, the gate line 101 and the source line 102). With such an aspect, the black film 224 functions as a black matrix layer to prevent the oblique-view color mixture.

Further, in a plan view, a width of the black film 224 is wider than the width of the metal wiring line on which the black film 224 overlaps. With such an aspect, it is possible to sufficiently suppress the oblique-view color mixture.

Fifth Embodiment

In the present embodiment, features specific to the present embodiment will be mainly described, and the description of the contents that overlap with the above-described embodiment will be omitted. The liquid crystal display device according to the present embodiment has configurations similar to the liquid crystal display device 1 according to the first embodiment except that, the counter substrate 200 does not include the black film 222 disposed on the observation surface side of the reflective layer 221.

Figure 11:
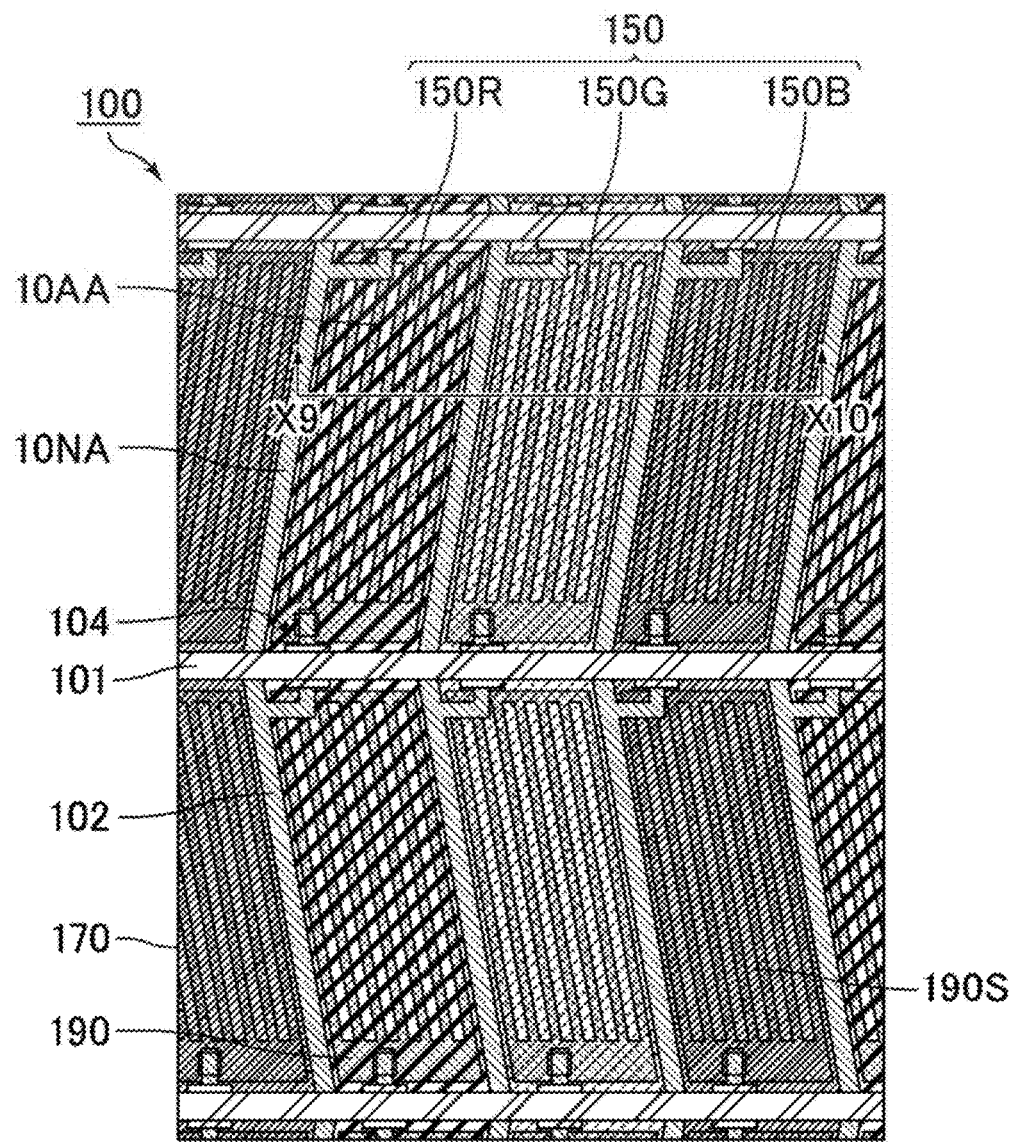
FIG. 11 is a schematic plan view illustrating a pixel configuration of an observation surface side substrate (TFT substrate) included in a liquid crystal display device according to a fifth embodiment.
Figure 12:
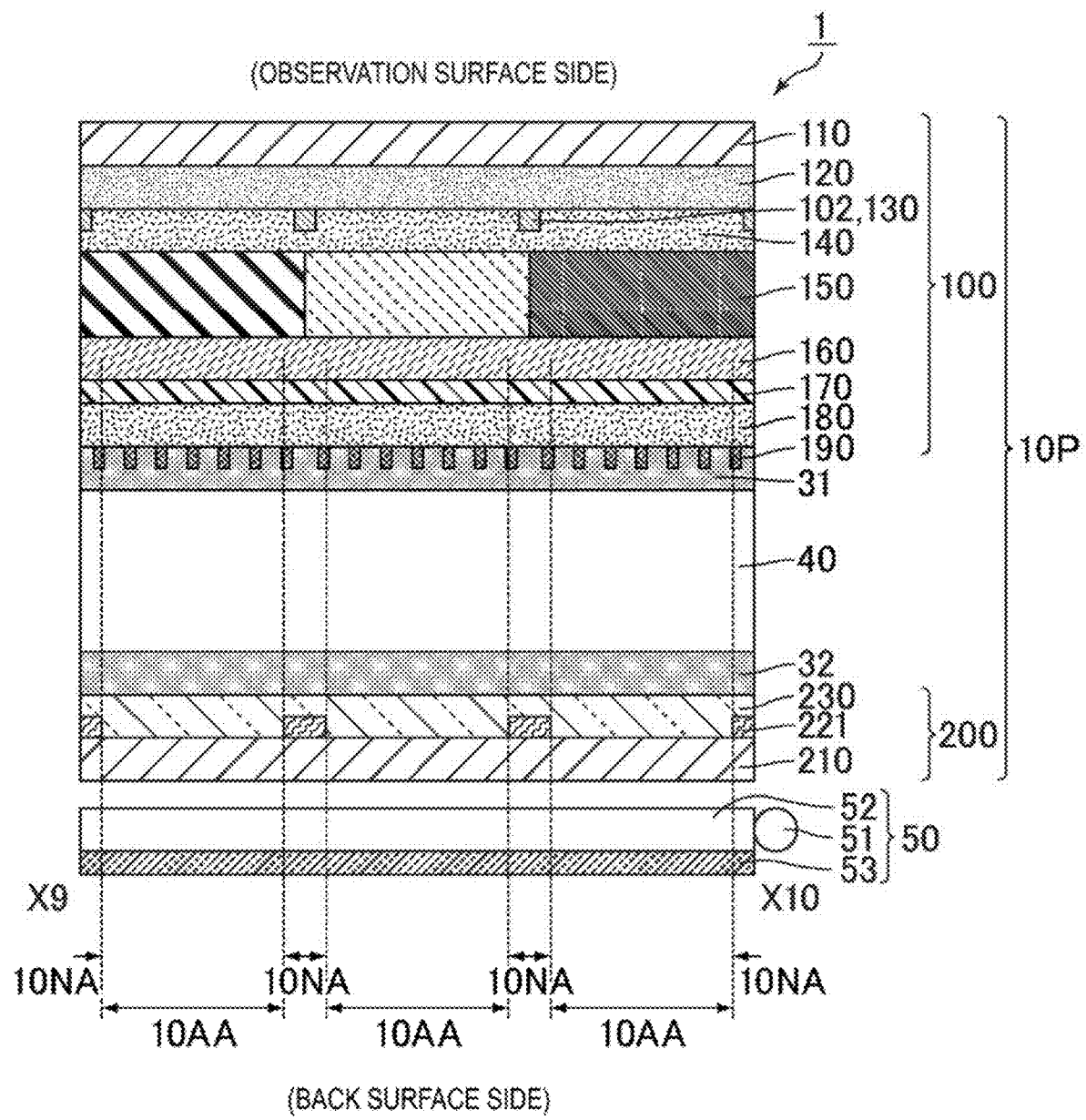
FIG. 12 is a schematic cross-sectional view of the liquid crystal display device according to the fifth embodiment along a line X9-X10 in FIG. 11.

FIG. 11 is a schematic plan view illustrating a pixel configuration of an observation surface side substrate (TFT substrate) included in a liquid crystal display device according to a fifth embodiment. FIG. 12 is a schematic cross-sectional view of the liquid crystal display device according to the fifth embodiment along the line X9-X10 in FIG. 11. FIG. 11 is a schematic plan view as viewed from the observation surface side. A schematic plan view of a back surface side substrate (counter substrate) included in the liquid crystal display device according to the fifth embodiment is similar to that of FIG. 9.

As illustrated in FIGS. 11 and 12, the counter substrate 200 included in the liquid crystal display device 1 according to the present embodiment does not include a black film. With such an aspect, in the present embodiment, the manufacturing process of the liquid crystal display device 1 can be simplified and the thickness of the liquid crystal display device 1 can be reduced as compared with the first embodiment. Further, the unevenness of the surface of the counter substrate 200 on the liquid crystal layer 40 side can be reduced, so that the cell gap in each pixel area (in each subpixel) can be made uniform, thereby enhancing the contrast of the liquid crystal panel. Although it is possible to obtain the effect of leveling the unevenness of the layered body including the reflective layer and the black film by the overcoat layer 230, the reflective layer alone is more likely to obtain the effect of leveling the unevenness.

Sixth Embodiment

In the present embodiment, features specific to the present embodiment will be mainly described, and the description of the contents that overlap with the above-described embodiment will be omitted. The liquid crystal display device according to the present embodiment has configurations similar to the liquid crystal display device 1 according to the first embodiment except that the counter substrate 200 does not include the black film 222 disposed on the observation surface side of the reflective layer 221, and the TFT substrate 100 includes the black film 223 on the observation surface side of the gate line 101 and the source line 102 as the metal wiring lines.

Figure 13:
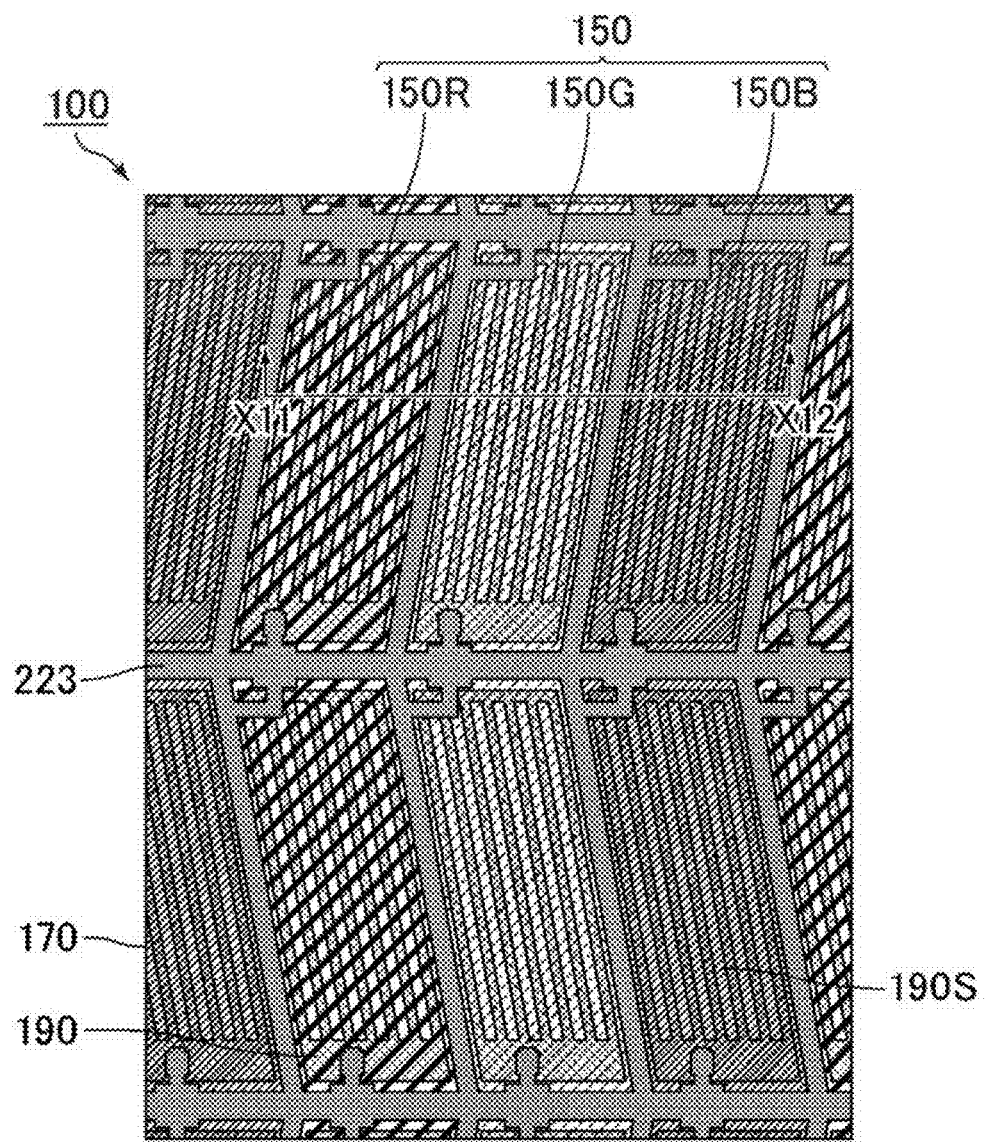
FIG. 13 is a schematic plan view illustrating a pixel configuration of an observation surface side substrate (TFT substrate) included in a liquid crystal display device according to a sixth embodiment.
Figure 14:
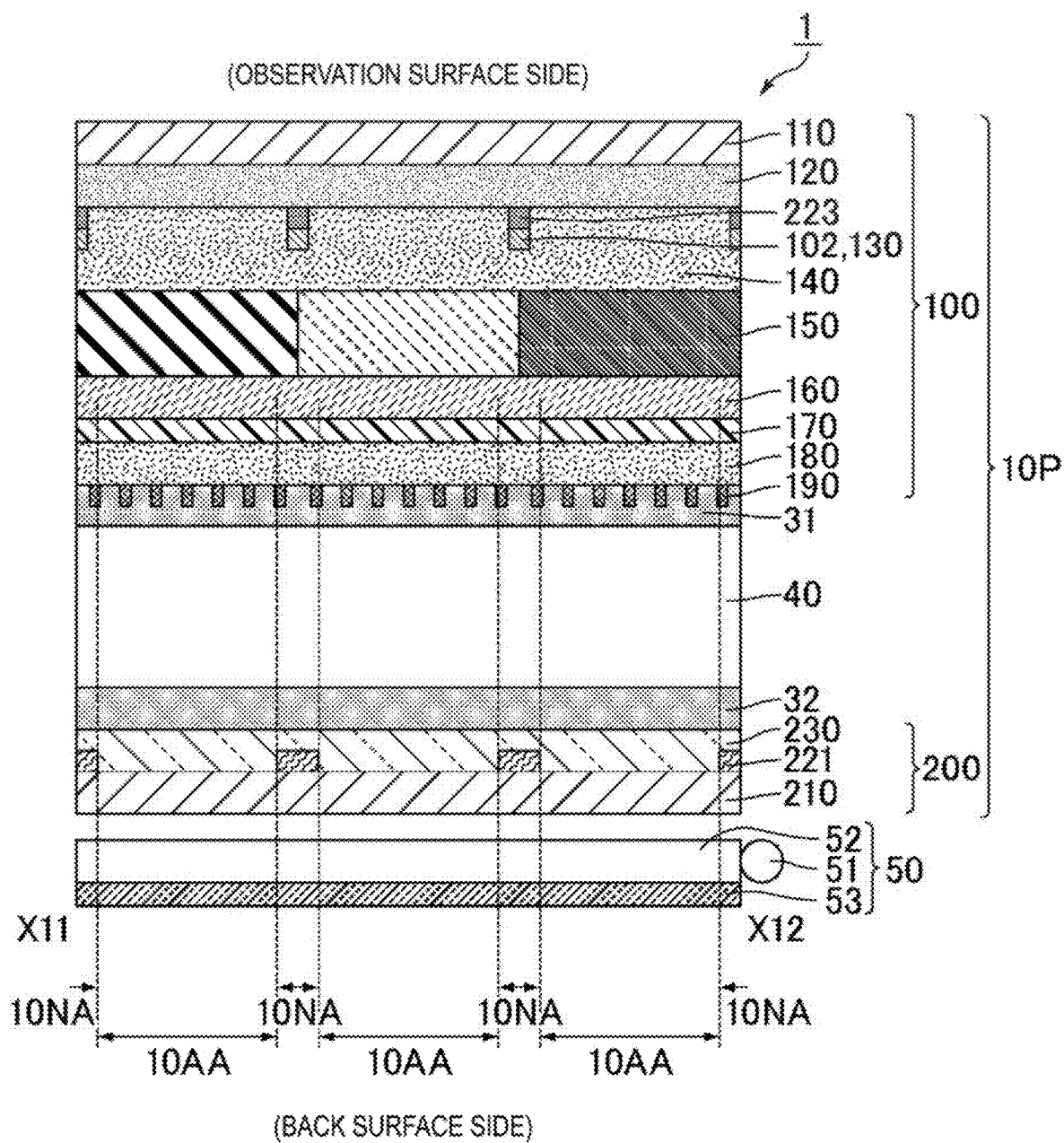
FIG. 14 is a schematic cross-sectional view of the liquid crystal display device according to the sixth embodiment along a line X11-X12 in FIG. 13.

FIG. 13 is a schematic plan view illustrating a pixel configuration of an observation surface side substrate (TFT substrate) included in a liquid crystal display device according to a sixth embodiment. FIG. 14 is a schematic cross-sectional view of the liquid crystal display device according to the sixth embodiment along the line X11-X12 in FIG. 13. FIG. 13 is a schematic plan view as viewed from the observation surface side. A schematic plan view of a back surface side substrate (counter substrate) included in the liquid crystal display device according to the sixth embodiment is similar to that of FIG. 9.

As illustrated in FIGS. 13 and 14, in the liquid crystal display device 1 according to the present embodiment, the counter substrate 200 does not include the black film 222, and the TFT substrate 100 includes the black film 223 on the observation surface side of the metal wiring lines such as the source line 102. With such an aspect, the black film 223 suppress the reflection of external light incident from the observation surface side by the metal wiring lines, and the black film 223 functions as a black matrix layer to suppress oblique-view color mixture, so that it is not necessary to separately provide a black matrix layer. As a result, the reflection of external light can be suppressed while reducing the film thickness of the liquid crystal display device 1.

Seventh Embodiment

In the present embodiment, features specific to the present embodiment will be mainly described, and the description of the contents that overlap with the above-described embodiment will be omitted. The liquid crystal display device according to the present, embodiment has configurations similar to the liquid crystal display device 1 according to the first embodiment except that the TFT substrate includes a touch panel drive wiring line disposed on the back surface side of the color filter layer (more specifically, the back surface side of the flattening film) and a third interlayer insulating film disposed on the back surface side of the touch panel drive wiring line, the counter substrate includes a black films on the observation surface side of the gate line and the source line as the metal wiring lines, and shapes of the first electrode 170 and the second electrode 190 are different.

Figure 15:
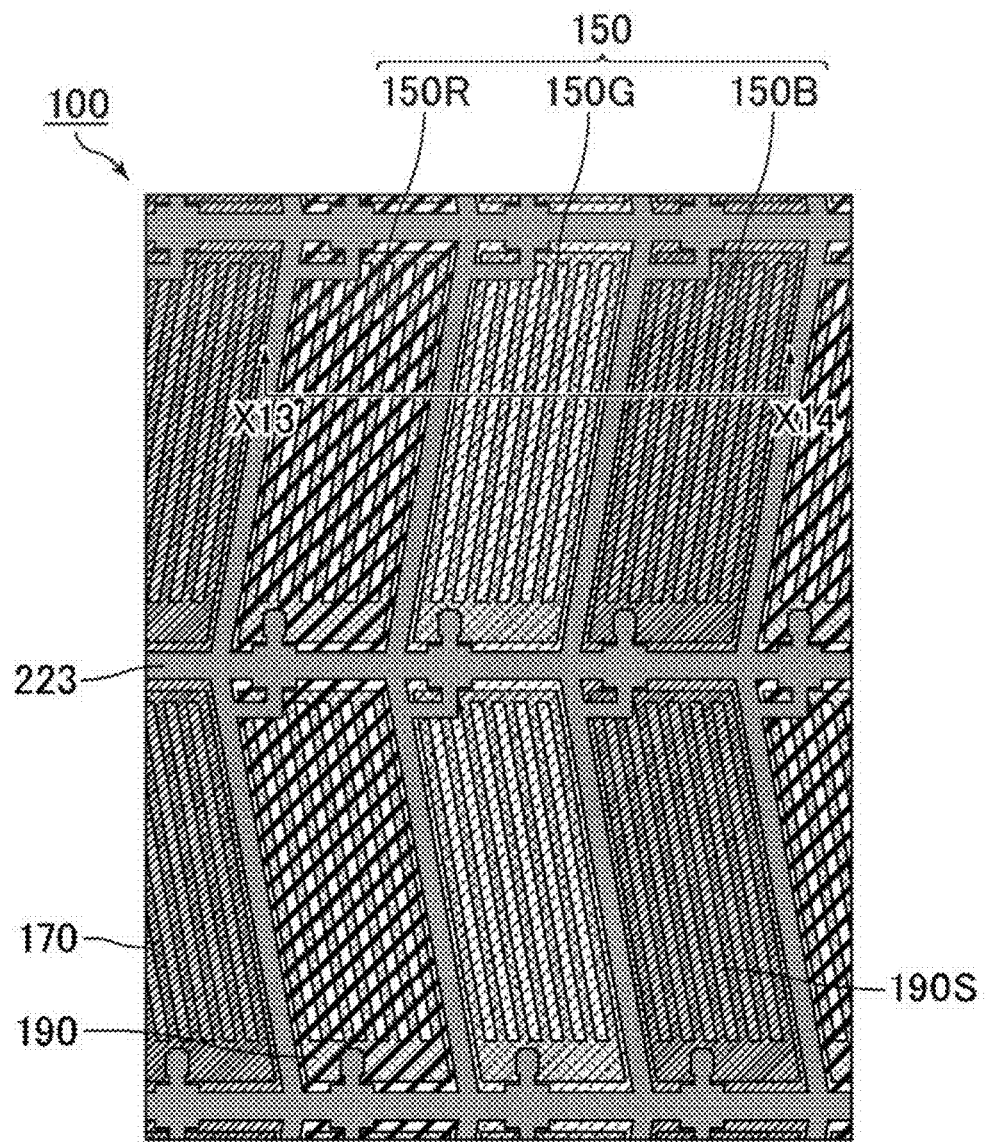
FIG. 15 is a schematic plan view illustrating a pixel configuration of an observation surface side substrate (TFT substrate) included in a liquid crystal display device according to a seventh embodiment.
Figure 16:
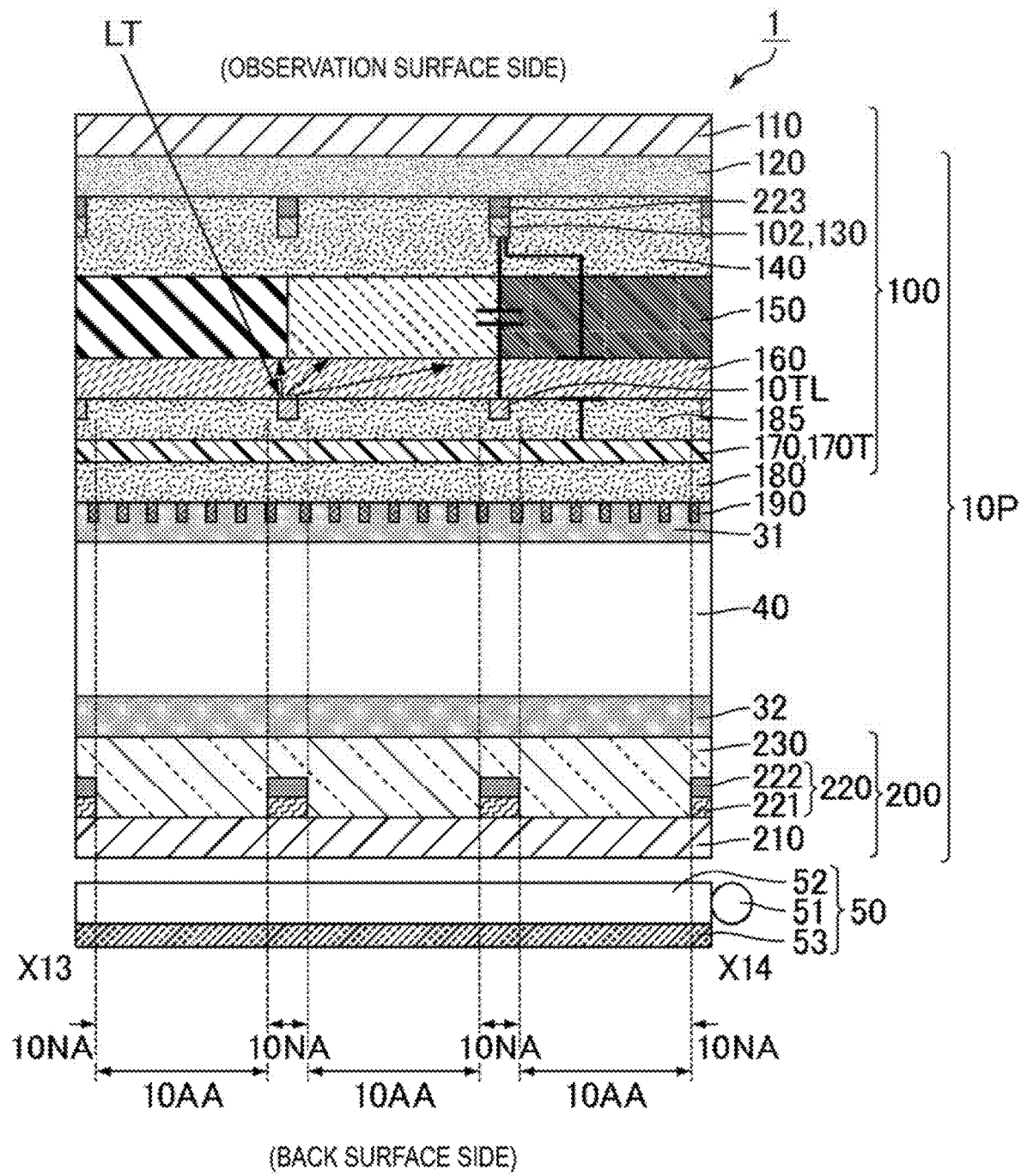
FIG. 16 is a schematic cross-sectional view of the liquid crystal display device according to the seventh embodiment along a line X13-X14 in FIG. 15.
Figure 17:
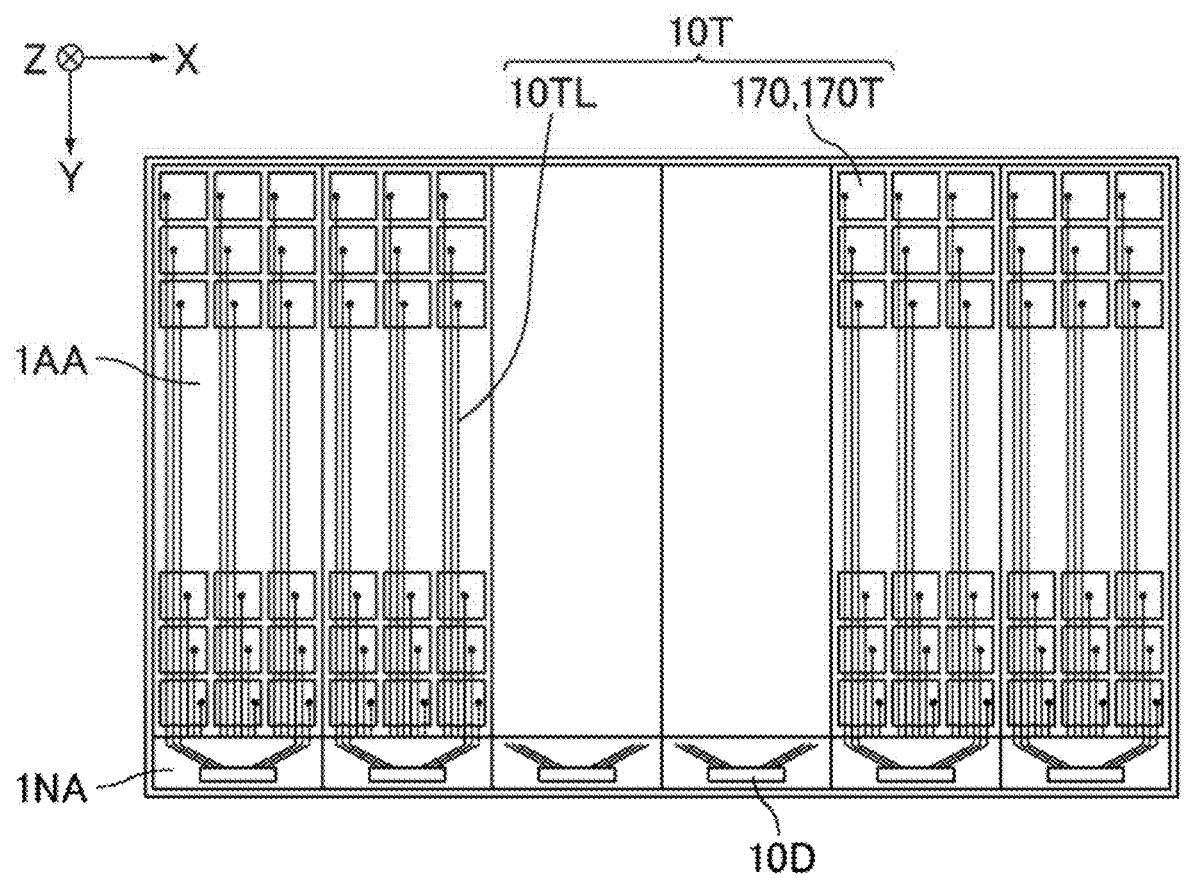
FIG. 17 is a schematic plan view illustrating a touch panel sensor included in the liquid crystal display device according to the seventh embodiment.
Figure 18:
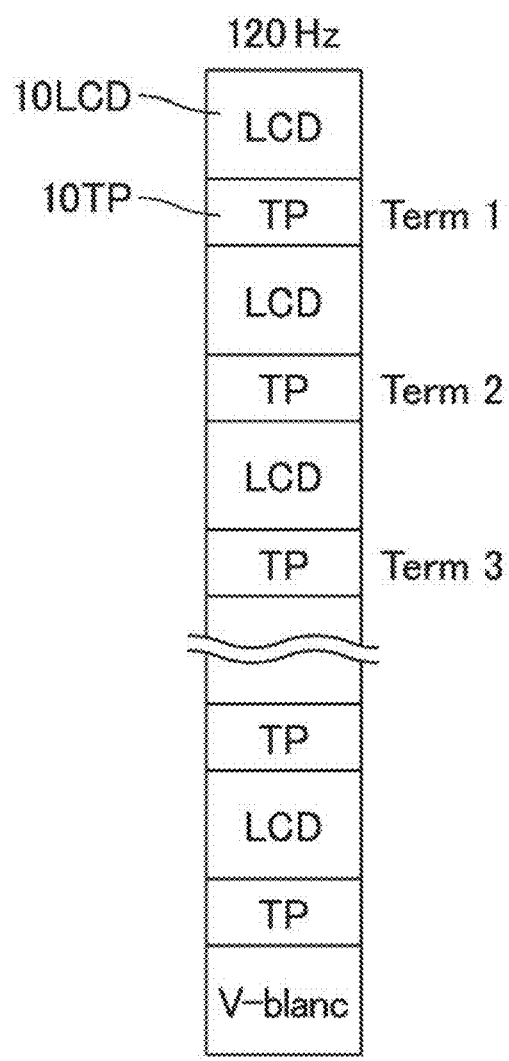
FIG. 18 is a timing chart illustrating a writing period and a sensing period of the liquid crystal display device according to the seventh embodiment.

FIG. 15 is a schematic plan view illustrating a pixel configuration of an observation surface side substrate (TFT substrate) included in a liquid crystal display device according to a seventh embodiment. FIG. 16 is a schematic cross-sectional view of the liquid crystal display device according to the seventh embodiment along the line X13-X14 in FIG. 15. FIG. 17 is a schematic plan view illustrating a touch panel sensor included in the liquid crystal display device in the seventh embodiment. FIG. 18 is a timing chart illustrating a writing period and a sensing period of the liquid crystal display device in the seventh embodiment. FIG. 15 is a schematic plan view as viewed from the observation surface side. A schematic plan view of a back surface side substrate (counter substrate) included in the liquid crystal display device according to the seventh embodiment is similar to that of FIG. 2.

As illustrated in FIGS. 15 and 16, in the liquid crystal display device 1 according to the present embodiment, the TFT substrate 100 includes a touch panel drive wiring line 10TL disposed on the back surface side of the color filter layer 150. With such an aspect, the reflection of the external light LT caused by the touch panel drive wiring line 10TL can be absorbed and attenuated by the color filter layer 150.

The touch panel drive wiring line 10TL is extended in the Y-axis direction and is provided so as to overlap the source line 102 also extending in the Y-axis direction. The touch panel drive wiring line 10TL is, for example, a single layer or a multilayer of a metal such as copper, titanium, molybdenum, aluminum, magnesium, cobalt, chromium, or tungsten, or an alloy thereof.

The TFT substrate 100 includes a third interlayer insulating film 185 on the back surface side of the touch panel drive wiring line 10TL. The third interlayer insulating film 185 is, for example, an inorganic insulating film. As the inorganic insulating film, for example, an inorganic film (relative dielectric constant $\varepsilon$=5 to 7) such as silicon nitride (SiNx) or silicon dioxide ($SiO_2$), or a layered film thereof can be used.

As illustrated in FIG. 16, in the TFT substrate 100, the metal wiring lines such as the source line 102 are disposed on the observation surface side of the color filter layer 150, and the touch panel drive wiring line 10TL is disposed on the back surface side of the color filter layer 150. With such an aspect, compared to the liquid crystal display device in which the color filter layer 150 is provided in the counter substrate 200, the distance between the touch panel drive wiring line 10TL and the metal wiring line can be increased, so that the load capacitance can be reduced, thereby enhancing the touch panel performance.

Figure 19:
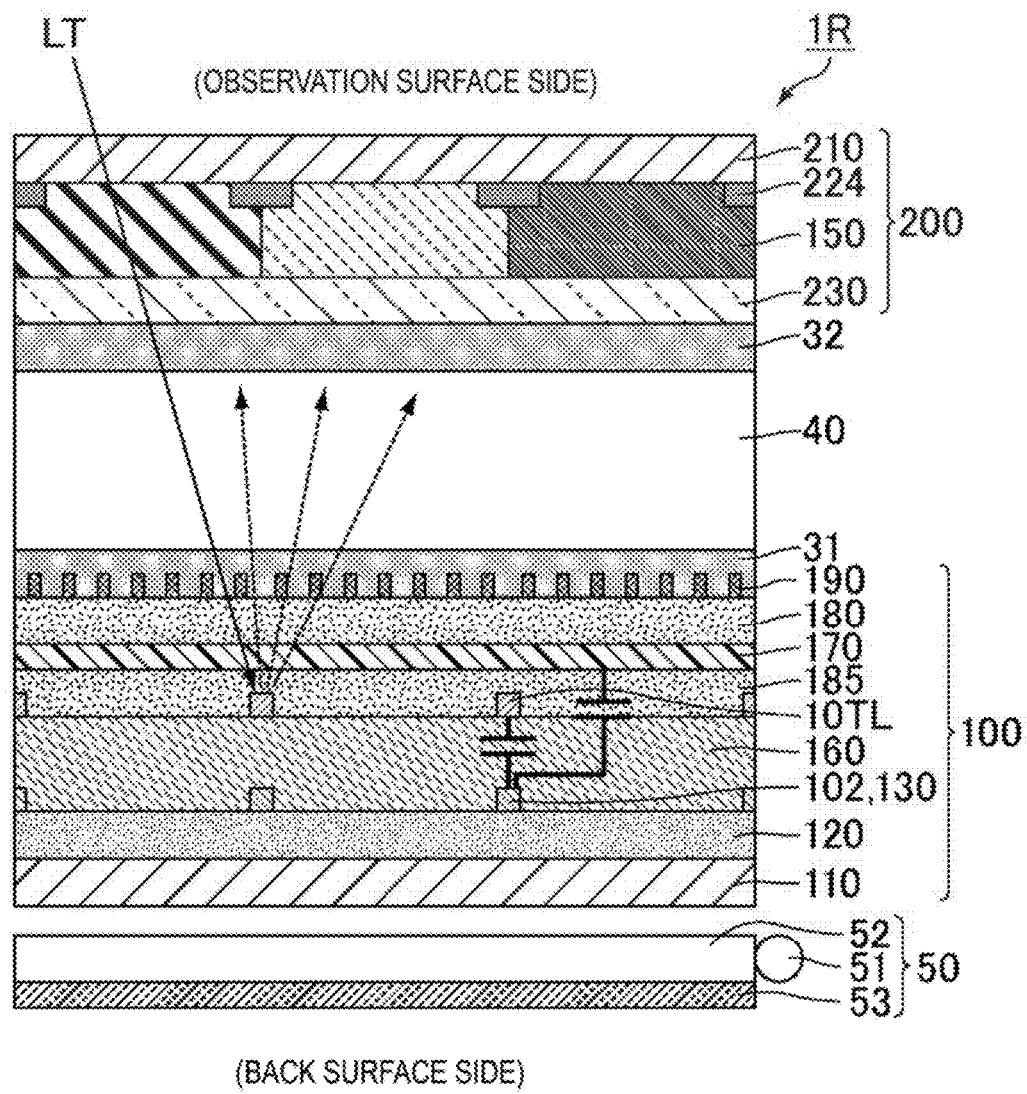
FIG. 19 is a schematic cross-sectional view of a liquid crystal display device according to a first comparative embodiment.

FIG. 19 is a schematic cross-sectional view of a liquid crystal display device according to a first comparative embodiment. A liquid crystal display device 1R according to the first comparative embodiment illustrated in FIG. 19 is a liquid crystal display device having a normal configuration in which the TFT substrate 100 including the metal wiring lines such as the source line 102 and the touch panel drive wiring line 10TL is disposed on the back surface side, and the counter substrate 200 including the color filter layer 150 is disposed on the observation surface side. In the liquid crystal display device 1R according to the first comparative embodiment, the external light LT reflected by the touch panel drive wiring line 10TL can be attenuated by the color filter layer 150. However, since the distance between the touch panel drive wiring line 10TL and the source line 102 is narrow, the load capacitance is large, which deteriorates the touch panel performance.

Figure 20:
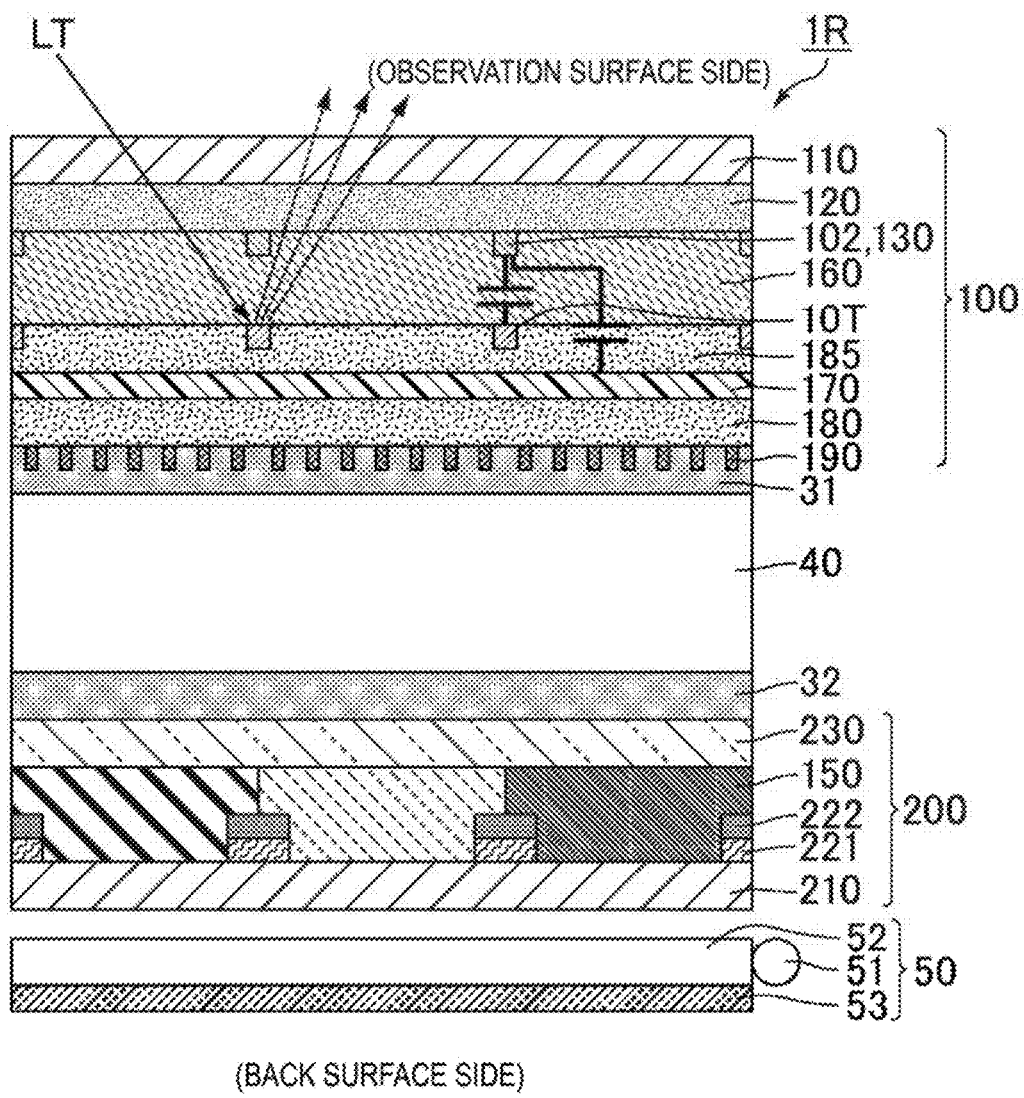
FIG. 20 is a schematic cross-sectional view of a liquid crystal display device according to a second comparative embodiment.

FIG. 20 is a schematic cross-sectional view of a liquid crystal display device according to a second comparative embodiment. The liquid crystal display device 1R according to the second comparative embodiment illustrated in FIG. 20 is a liquid crystal display device having an inverted configuration in which the TFT substrate 100 including the metal wiring lines such as the source line 102 and the touch panel drive wiring line 10TL is disposed on the observation surface side, and the counter substrate 200 including the color filter layer 150 is disposed on the back surface side. In the liquid crystal display device 1R according to the second comparative embodiment, since the color filter layer 150 is not disposed on the observation surface side of the touch panel drive wiring line 10TL as in the first comparative embodiment, the external light LT reflected by the touch panel drive wiring line 10TL is hardly attenuated and is visually recognized on the observation surface side, which lowers the contrast. In addition, since the distance between the touch panel drive wiring line 10TL and the source line 102 is short, the load capacitance is large, which deteriorates the touch panel performance.

As illustrated in FIG. 16, in the TFT substrate 100, the metal wiring lines such as the source line 102 are disposed on the observation surface side of the color filter layer 150, and the first electrode 170 is disposed on the back surface side of the color filter layer 150. With such an aspect, compared to the liquid crystal display device in which the color filter layer 150 is provided the counter substrate 200, the distance between the first electrode 170 and the metal wiring lines can be increased, so that the load capacitance can be reduced, thereby enhancing the touch panel performance.

In a full in-cell touch panel, in the TFT substrate, each segment electrode (common electrode) is coupled to a driver by the touch panel drive wiring line. In the case of the normal configuration, since the reflection of the external light caused by the touch panel drive wiring line is absorbed by the color filter layer, the intensity of the reflected light becomes small, so that the reflected light becomes invisible. On the other hand, in the case of the inverted configuration, since the TFT substrate is disposed on the observer side, the intensity of the reflected light is large, which reduces the contrast.

As described above, in both the normal configuration and the inverted configuration, it is not possible to obtain both suppression of the reflection of external light and enhancement of touch panel performance. However, in the liquid crystal display device 1 according to the present embodiment, in the TFT substrate 100, by disposing the metal wiring lines such as the source line 102 on the observation surface side of the color filter layer 150, and disposing the touch panel drive wiring line 10TL and the first electrode 170 on the back surface side of the color filter layer 150, while suppressing the reflection of external light LT caused by the touch panel drive wiring line 10TL, the load capacitances between the metal wiring line and the touch panel drive wiring line 10TL and between the metal wiring line and the first electrode 170 can be reduced, thereby enhancing the touch panel performance.

As illustrated in FIG. 17, the liquid crystal display device 1 is provided with a display region 1AA on which an image is displayed and a non-display region 1NA provided around display region 1AA, and includes a self capacitance in-cell touch panel sensor 10T including a plurality of touch panel electrodes 170T provided in the display region 1AA and a plurality of touch panel drive wiring lines 10TL.

Each touch panel electrode 170T has a rectangular shape, and a plurality of touch panel electrodes 170T are disposed on the TFT substrate 100 in a matrix shape. Each touch panel electrode 170T is, for example, a substantially square having a side of several millimeters. Each touch panel drive wiring line 10TL is coupled to any one of the plurality of touch panel electrodes 170T. A black circle illustrated in FIG. 17 represents a contact portion where the touch panel drive wiring line 10TL and the touch panel electrode 170T are coupled. In the non-display region 1NA, drivers 10D coupled the source lines 102 and the touch panel drive wiring lines 10TL are disposed. Note that the driver 10D is constituted of an IC chip.

As illustrated in FIG. 17, the touch panel electrodes 170T are electrodes formed by dividing the first electrode (common electrode) 170 for applying a common voltage to each pixel. Each touch panel electrode 170T is provided in a planar manner so as to overlap a plurality of pixels.

As illustrated in FIG. 18, the touch panel electrode 170T is set to a pixel reference potential (common voltage) as the common electrode (first electrode 170) during a writing period 10LCD in which a display signal, which is a signal for display, is written to each pixel. The touch panel electrode 170T functions as the touch panel electrode 170T during a sensing period 10TP in which no display signal is written (gate scanning is not performed).

Each touch panel electrode 170T forms a parasitic capacitance with an adjacent touch panel electrode 170T or the like. However, when a human finger or the like touches the display screen, capacitance is formed between the touch panel electrode 170T and the human finger or the like, so that the electrostatic capacitance increases. One touch panel drive wiring line 10TL is coupled to each touch panel electrode 170T, and during the sensing period 10TP, the driver 10D supplies a touch drive signal for detecting a touch position to the touch panel electrode 170T via the touch panel drive wiring line 10TL, and receives a touch detection signal via the touch panel drive wiring line 10TL. In this way, the change in electrostatic capacitance at the position where the touch panel electrode 170T is located is detected, thereby detecting the touch position. In other words, the touch panel drive wiring line 10TL functions as a wiring line for transmitting the touch drive signal and receiving the touch detection signal. Examples of the touch drive signal include a pulse signal applied to detect a change in electrostatic capacitance in each touch panel electrode 170T.

In this manner, during the sensing period 10TP, the pulse signal is applied from the driver 10D to each touch panel electrode 170T via the corresponding touch panel drive wiring line 10TL, and by detecting this change in electrostatic capacitance with the driver 10D, it is possible to detect whether a pointer has touched and/or approached. The change in electrostatic capacitance can be obtained by driving the touch panel sensor 10T a plurality of times during the sensing period 10TP. The driver 10D functions both as a source driver that supplies a data signal to the source line 102, and as a touch sensor driver that supplies a pulse signal to the touch panel drive wiring line 10TL.

The touch panel sensor 10T of the present embodiment includes, for example, 3780(=84×45) touch panel electrodes 170T divided into 3.5 mm×3.7 mm. Each touch panel electrode 170T is coupled to the driver 10D via the touch panel drive wiring line 10TL. The touch panel drive wiring line 10LT is disposed between the source line 102 and the first electrode 170 (touch panel electrode 170T) so as to overlap the source line 102 with the first interlayer insulating film 140, the color filter layer 150, and the flattening film 160 interposed therebetween.

The disclosure will be described in more detail below using examples and comparative examples, but the disclosure is not limited to these examples.

Example 1

The liquid crystal display device 1 according to Example 1 having configurations similar to the liquid crystal display device 1 according to the first embodiment illustrated in FIGS. 1 to 3 was prepared. The liquid crystal drive mode was an FFS mode, the gate insulating film 120 was an inorganic insulating film of $SiO_2$, the source wiring line layer 130 was a layered body of a copper film and a titanium film, the first interlayer insulating film 140 was an inorganic insulating film of $SiO_2$, the flattening film 160 was made of an acrylic resin, the first electrode 170 was a planar (solid) ITO film, the second interlayer insulating film 180 was an inorganic insulating film of SiNx, and the second electrode 190 was an ITO film provided with slits. The color filter layer 150 was disposed between the first interlayer insulating film 140 and the flattening film 160. The reflective layer 221 was an Al layer and the black film 222 was a black resist. A width of the reflective layer 221 was the same as a width of the black film 222, and the reflective layer 221 is provided so as to overlap the black film 222. The liquid crystal layer 40 contained a negative liquid crystal, and $\Delta n=0.105$. The overcoat layer 230 was an acrylic resin film.

The widths of the reflective layer 221 and the black film 222 were 7 μm, the cell gap of the liquid crystal layer 40 was 3 μm, a width of the source line 102 was 4 μm, the ratio of a width L of the second electrode 190 to a width S of the slit L/S=2.7 μm/4.3 μm, and a width of each pixel provided with the single second electrode 190 was 58 μm.

Example 2

The liquid crystal display device 1 according to Example 2 having configurations similar to the liquid crystal display device 1 according to the second embodiment illustrated in FIGS. 4 and 5 was prepared. The liquid crystal display device 1 according to Example 2 had configurations similar to the liquid crystal display device according to Example 1 except that the TFT substrate 100 includes the black film 223 made of a titanium nitride (TiN) film on the observation surface side of the gate line 101 and the source line 102 as the metal wiring lines.

Example 3

The liquid crystal display device 1 according to Example 3 having configurations similar to the liquid crystal display device 1 according to the third embodiment illustrated in FIGS. 6 and 7 was prepared. The liquid crystal display device 1 according to Example 3 had configurations similar to the liquid crystal display device according to Example 1 except that the color filter layer 150 was disposed between the support substrate 110 and the gate insulating film 120.

Example 4

The liquid crystal display device 1 according to Example 4 having configurations similar to the liquid crystal display device 1 according to the fourth embodiment illustrated in FIGS. to 10 was prepared. The liquid crystal display device 1 according to Example 4 had configurations similar to the liquid crystal display device according to Example 1 except that the color filter layer 150 was disposed between the support substrate 110 and the gate insulating film 120, the counter substrate 200 did not include the black film 222 disposed on the observation surface side of the reflective layer 221, and the TFT substrate 100 included the black film 224 disposed between the support substrate 110 and the color filter layer 150.

Example 5

The liquid crystal display device 1 according to Example 5 having configurations similar to the liquid crystal display device 1 according to the fifth embodiment illustrated in FIGS. 11 and 12 was prepared. The liquid crystal display device 1 according to Example 5 had configurations similar to the liquid crystal display device according to Example 1 except that the counter substrate 200 did not include the black film 222 disposed on the observation surface side of the reflective layer 221.

Example 6

The liquid crystal display device 1 according to Example 6 having configurations similar to the liquid crystal display device 1 according to the sixth embodiment illustrated in FIGS. 13 and 14 was prepared. The liquid crystal display device 1 according to Example 6 had configurations similar to the liquid crystal display device according to Example 1 except that the counter substrate 200 did not include the black film 222 disposed on the observation surface side of the reflective layer 221, and the TFT substrate 100 included the black film 223 made of a titanium nitride film on the observation surface side of the gate line 101 and the source line 102 as the metal wiring lines.

Comparative Example 1

Figure 21:
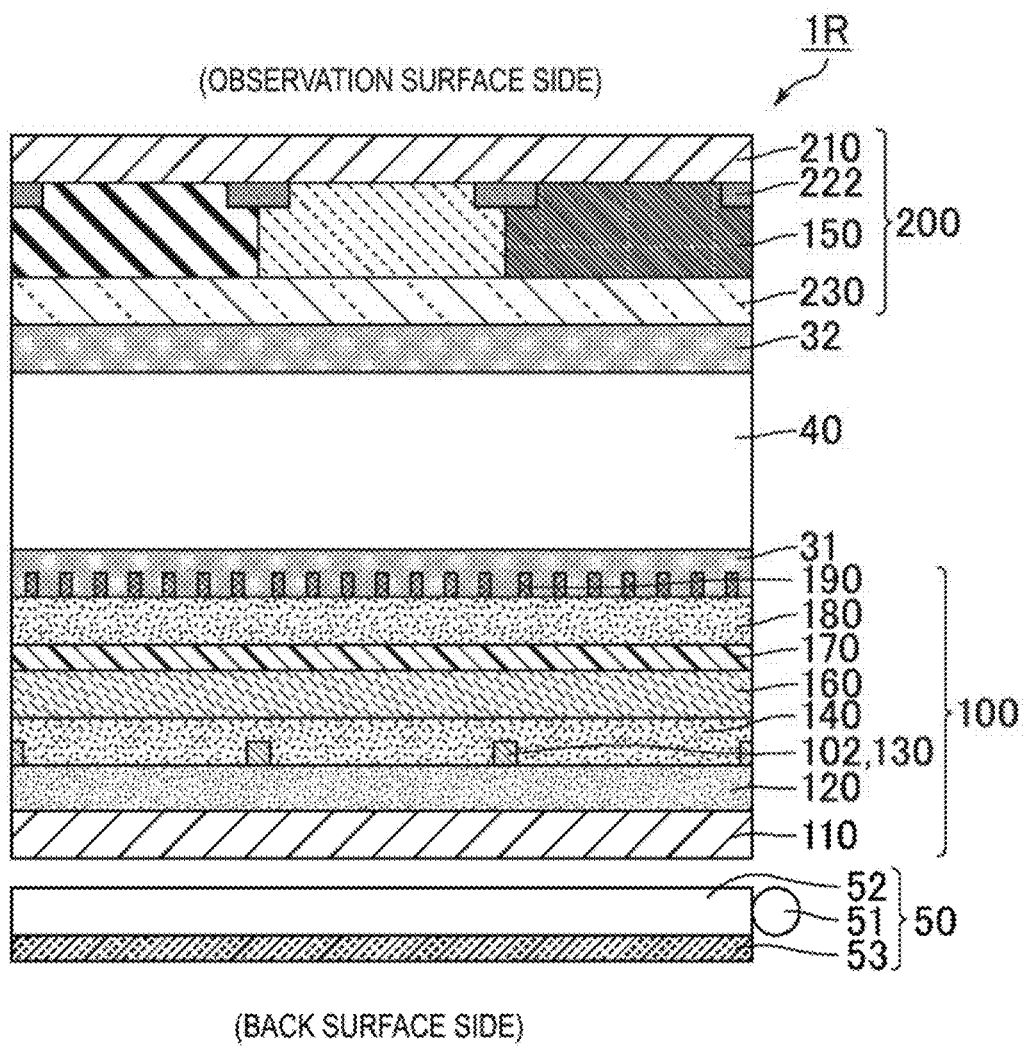
FIG. 21 is a schematic cross-sectional view of a liquid crystal display device according to Comparative Example 1.

FIG. 21 is a schematic cross-sectional view of a liquid crystal display device according to Comparative Example 1. The liquid crystal display device 1R according to Comparative Example 1 illustrated in FIG. 21 was prepared. The liquid crystal display device 1R according to Comparative Example 1 had configurations similar to the liquid crystal display device 1 according to Example 1 except that the TFT substrate 100 was disposed on the back surface side, the counter substrate 200 was disposed on the observation surface side, the color filter layer 150 was disposed in the counter substrate 200, and the reflective layer 221 was not provided.

Comparative Example 2

Figure 22:
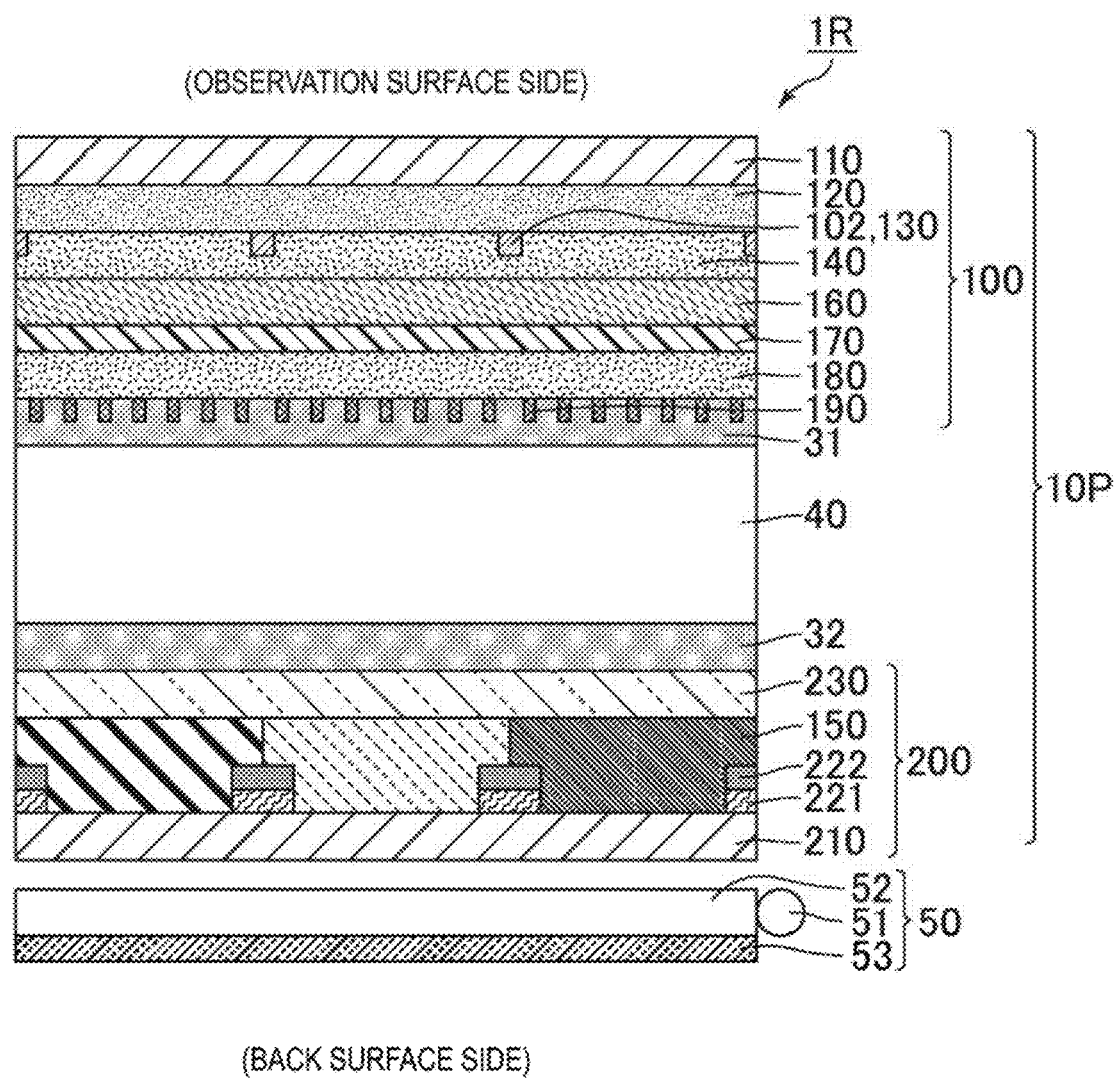
FIG. 22 is a schematic cross-sectional view of a liquid crystal display device according to Comparative Example 2.

FIG. 22 is a schematic cross-sectional view of a liquid crystal display device according to Comparative Example 2. The liquid crystal display device 1R according to Comparative Example 2 illustrated in FIG. 22 was prepared. The liquid crystal display device 1R according to Comparative Example 2 had configurations similar to the liquid crystal display device 1 according to Example 1 except that the color filter layer 150 was disposed on the counter substrate 200 side.

Comparative Example 3

Figure 23:
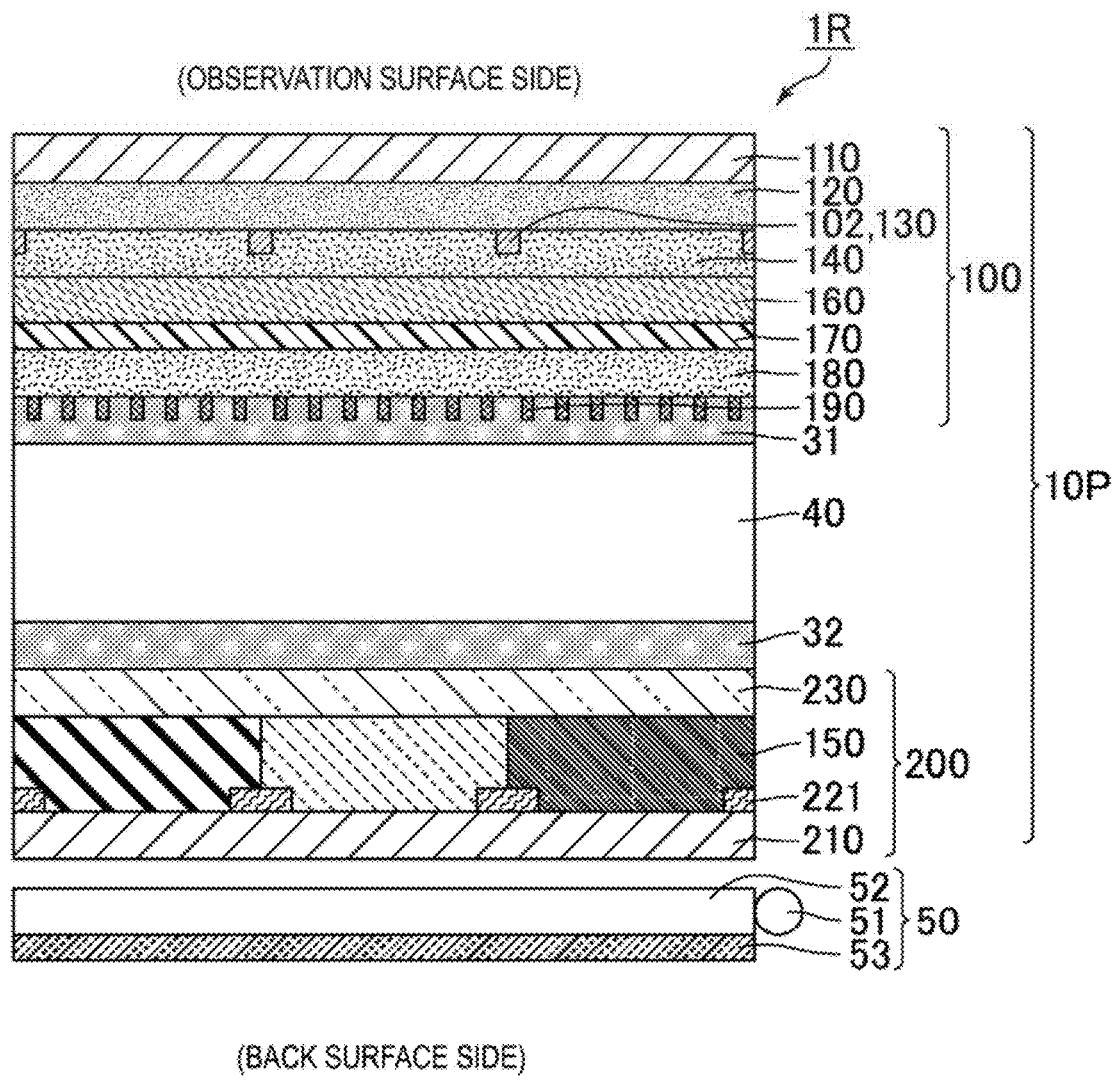
FIG. 23 is a schematic cross-sectional view of a liquid crystal display device according to Comparative Example 3.

FIG. 23 is a schematic cross-sectional view of a liquid crystal display device according to Comparative Example 3. The liquid crystal display device 1R according to Comparative Example 3 illustrated in FIG. 23 was prepared. The liquid crystal display device 1R according to Comparative Example 3 had configurations similar to the liquid crystal display device 1 according to Example 1 except that the color filter layer 150 was disposed on the counter substrate 200 side and the black film 222 was not disposed.

Evaluation Results

Various characteristics of the liquid crystal display devices prepared as Examples and Comparative Examples were measured, and the results are shown in Table 1 below.

[1] Panel Brightness and Brightness Enhancement Ratio

As the panel brightness, the brightness when white display was performed at the highest gray scale (gray scale 255) was measured in a dark room. Further, as the brightness enhancement ratio, the ratio of the panel brightness obtained for each liquid crystal display device to the panel brightness obtained for the liquid crystal display device according to Comparative Example 1 was calculated. The backlight brightness was 6000 cd/cm$^2$. The backlight was a normal type provided with two lens sheets. That is, the backlight included a first lens sheet with an uneven shape portion having a first ridge line, a second lens sheet with uneven shape portion having a second ridge line orthogonal to the first ridge line, a diffuser sheet, a light guide plate, and an edge light (LED). The BEF series manufactured by 3M Company was used for the lens sheet. SR-UL1 (manufactured by Topcon Corporation) was used as a brightness measurement device, and measurement was performed with a 1° field of view.

2 Panel Reflectance

Figure 24:
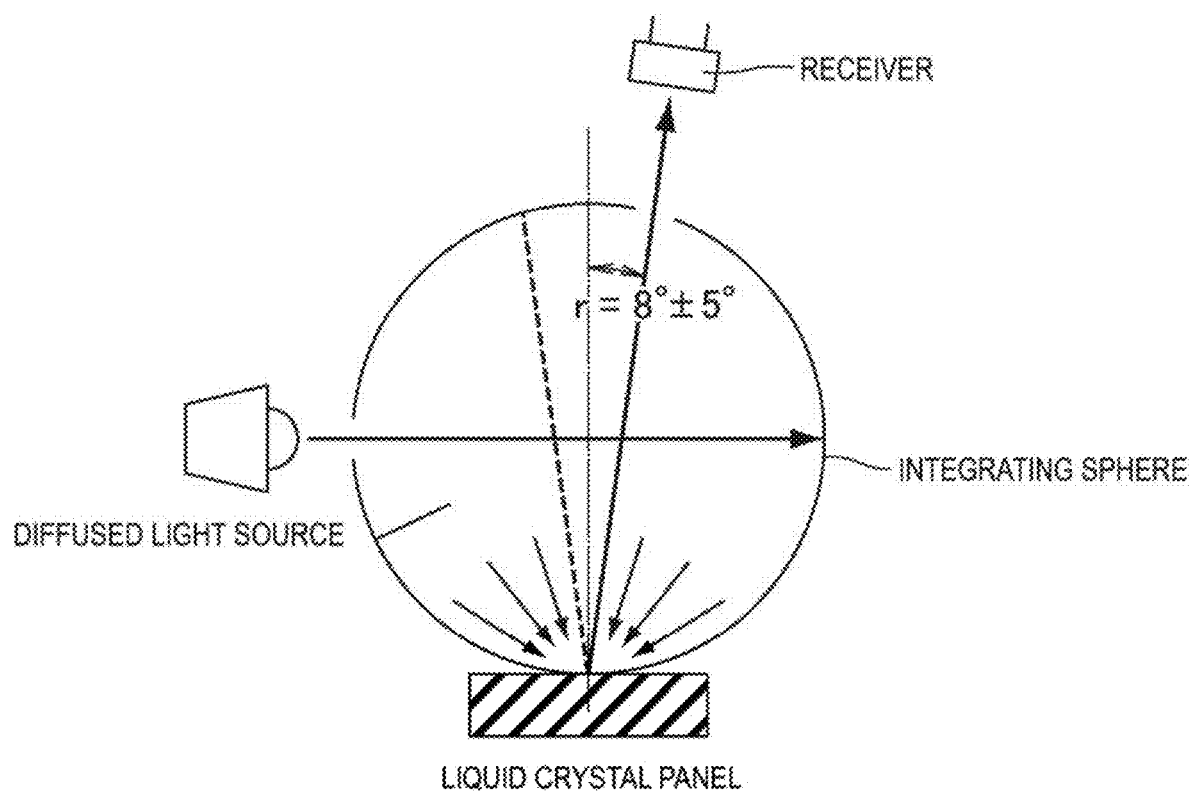
FIG. 24 is a diagram illustrating a method for measuring an internal reflectance.

FIG. 24 is a diagram illustrating a method for measuring an internal reflectance. The internal reflectance of the panel was obtained by subtracting the reflectance on the polarizer surface from the total reflectance on the surface of the liquid crystal panel. As illustrated in FIG. 24, to measure the internal reflectance, the light from a diffused light source (pulse xenon lamp) was incident on the integrating sphere, and the light reflected from the surface of the liquid crystal panel was received at an angle of 8°. In order to calculate the internal reflection of the liquid crystal panel, it is necessary to subtract the surface reflectance of the polarizer attached to the surface of the liquid crystal panel. Therefore, in addition to the reflection measurement of the liquid crystal panel, a sample was prepared in which the same polarizer as that attached to the front face of the liquid crystal panel was attached to a black acrylic material or the like that completely absorbs light in the back surface, and the surface reflectance of the polarizer was measured. CM-2600d (manufactured by Konica Minolta, Inc.) was used to measure the internal reflectance.

3 Iridescent Reflection

In a state in which the front polarizer (first linear polarizer) was attached to the liquid crystal panel, a white fluorescent lamp was reflected on the surface of the liquid crystal panel, and the presence or absence of iridescent reflection occurring around the image of the reflected fluorescent lamp was visually evaluated.

TABLE 1

| | Comparative Example 1 | Comparative Example 2 | Comparative Example 3 | Example 1 | Example 2 | Example 3 | Example 4 | Example 5 | Example 6 |
|---|---|---|---|---|---|---|---|---|---|
| Panel Brightness | 500 cd/m$^2$ | 580 cd/m$^2$ | 580 cd/m$^2$ | 580 cd/m$^2$ | 580 cd/m$^2$ | 580 cd/m$^2$ | 580 cd/m$^2$ | 580 cd/m$^2$ | 580 cd/m$^2$ |
| Brightness Enhancement Ratio | 100% | 116% | 116% | 116% | 116% | 116% | 116% | 116% | 116% |

TABLE 1-continued

|  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|
| Panel Reflectance | 5.2% | 9.1% | 10.1% | 7.5% | 5.3% | 4.9% | 5.2% | 8.5% | 6.3% |
| Iridescent Reflection | Excellent Not Visible | Poor Visible | Poor Visible | Excellent Not Visible | Excellent Not Visible | Excellent Not Visible | Excellent Not Visible | Excellent Not Visible | Excellent Not Visible |

In Example 1, it was confirmed that by disposing the color filter layer 150 between the first interlayer insulating film 140 and the flattening film 160 of the TFT substrate 100 disposed on the observation surface side, the diffracted light of the external light caused by the second electrode 190 provided with the slits was able to be absorbed by the color filter layer 150, thereby suppressing the iridescent reflection.

In Example 2, in addition to the configuration of the liquid crystal display device 1 according to Example 1, by disposing the black film 223 on the gate line 101 and the source line 102, reflection from the metal wiring lines was able to be suppressed.

In Example 3, it was confirmed that by disposing the color filter layer 150 between the support substrate 110 and the gate insulating film 120 compared with the configuration of the liquid crystal display device 1 according to Example 1, not only the iridescent reflection but also the reflected light from the metal wiring lines such as the source line 102 was also able to be absorbed by the color filter layer 150, thereby suppressing the reflected light.

In Example 4, it was confirmed that by disposing the color filter layer 150 between the support substrate 110 and the gate insulating film 120 compared with the configuration of the liquid crystal display device 1 according to Example 1, not only the iridescent reflection but also the reflected light from the metal wiring lines such as the source line 102 was also able to be absorbed by the color filter layer 150, thereby suppressing the reflected light. Further, it was confirmed that by disposing the black film 224 between the support substrate 110 and the color filter layer 150 included in the TFT substrate disposed on the observation surface side, the reflected light from the metal wiring lines was able to be suppressed.

In Example 6, by disposing the black film 223 on the gate line 111 and the source line 102, the reflection from the metal wiring lines was able to be suppressed.

While preferred embodiments of the present invention have been described above, to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising: in order from an observation surface side to a back surface side,
    a thin film transistor substrate including a color filter layer, a pair of electrodes disposed in a pixel area, and a metal wiring line disposed outside the pixel area;
    a liquid crystal layer containing liquid crystal molecules that are horizontally aligned to the thin film transistor substrate, and in which alignment of the liquid crystal molecules is changed due to an electric field generated by applying a voltage to the pair of electrodes;
    a counter substrate; and
    a backlight,
    wherein the counter substrate includes a reflective layer disposed outside the pixel area and reflecting incident light from the backlight to the back surface side,
    the pair of electrodes include a first electrode having a planar shape and a second electrode provided with a slit, and
    the color filter layer is disposed on the observation surface side of the second electrode,
    wherein the thin film transistor substrate further includes a touch panel drive wiring line disposed on the back surface side of the color filter layer.

2. The liquid crystal display device according to claim 1, wherein the thin film transistor substrate further includes a black film disposed on the observation surface side of the metal wiring line.

3. The liquid crystal display device according to claim 1, wherein the color filter layer is disposed on the observation surface side of the metal wiring line.

4. The liquid crystal display device according to claim 3, wherein the thin film transistor substrate further includes a black film disposed on the observation surface side of the color filter layer.

5. The liquid crystal display device according to claim 1, wherein the counter substrate further includes a black film disposed on the observation surface side of the reflective layer.

6. The liquid crystal display device according to claim 1, wherein the color filter layer is disposed between the touch panel drive wiring line and the metal wiring line.

* * * * *